(12) United States Patent
Faulhaber et al.

(10) Patent No.: US 11,531,731 B2
(45) Date of Patent: Dec. 20, 2022

(54) STANDARDIZED GRAPH-BASED FRAMEWORK FOR DETERMINING AN EQUIVALENT LICENSE UNIT METRIC FOR AN ENTERPRISE COMPUTER SYSTEM

(71) Applicant: Flexera Software LLC, Itasca, IL (US)

(72) Inventors: Michael J. Faulhaber, Batavia, IL (US); Bradley W. Wong, Arlington Heighls, IL (US); Nicholas J. Bikos, Carol Stream, IL (US)

(73) Assignee: Flexera Software LLC, Itasca, IL (US)

( * ) Notice: Subject to any disclaimer, the term of this patent is extended or adjusted under 35 U.S.C. 154(b) by 713 days.

(21) Appl. No.: 15/969,685

(22) Filed: May 2, 2018

(65) Prior Publication Data
US 2019/0340337 A1    Nov. 7, 2019

(51) Int. Cl.
G06F 21/10    (2013.01)

(52) U.S. Cl.
CPC ....... *G06F 21/105* (2013.01); *G06Q 2220/18* (2013.01)

(58) Field of Classification Search
None
See application file for complete search history.

(56) References Cited

U.S. PATENT DOCUMENTS

| | | | | |
|---|---|---|---|---|
| 2013/0198734 A1* | 8/2013 | Biswas | ................. | G06F 21/105 717/174 |
| 2015/0082443 A1* | 3/2015 | Behar | ..................... | G06F 21/12 726/26 |
| 2015/0312422 A1* | 10/2015 | Leemet | ................ | G06Q 20/384 455/406 |
| 2017/0053294 A1* | 2/2017 | Yang | .................... | G06F 16/9024 |
| 2017/0236079 A1* | 8/2017 | Venna | ................... | G06F 16/338 705/4 |
| 2017/0270284 A1* | 9/2017 | Sreesha | ................. | G06F 21/105 |
| 2019/0080370 A1* | 3/2019 | Copeland | ............ | H04M 3/5175 |
| 2019/0102849 A1* | 4/2019 | Bertot | .................. | G06F 3/0482 |
| 2019/0171669 A1* | 6/2019 | Patankar | ............... | G01M 17/00 |

(Continued)

FOREIGN PATENT DOCUMENTS

EP    1916596 A1 *    4/2008    ............... G06F 8/71

*Primary Examiner* — Neha Patel
*Assistant Examiner* — Jahed Ali
(74) *Attorney, Agent, or Firm* — Knobbe, Martens, Olson & Bear, LLP

(57) ABSTRACT

Embodiments include a computer-implemented method for determining an equivalent license unit of an enterprise computer system in accordance with a standardized graph-based framework. The method includes discovering licensable products of an enterprise computer system in accordance with a standardized graph-based framework, and constructing a licensable product star graph (LPSG) for each licensable product in accordance with the standardized graph-based framework to identify any license models that have at least one subgraph associated with the licensable product. The method further includes constructing a licensable product constellation graph (LPCG) in accordance with the standardized graph-based framework by evaluating each LPSG to determine any common target elements of any license model to link the LPSGs, and determining an equivalent license unit metric for the license models based on the LPCG.

20 Claims, 12 Drawing Sheets

(56) References Cited

U.S. PATENT DOCUMENTS

2019/0295078 A1* 9/2019 Bae .................... G06F 16/1824
2019/0340557 A1* 11/2019 Faulhaber ............... G06F 21/10
2020/0272662 A1* 8/2020 Markovic ........... G06F 16/9024

* cited by examiner

US 11,531,731 B2

STANDARDIZED GRAPH-BASED FRAMEWORK FOR DETERMINING AN EQUIVALENT LICENSE UNIT METRIC FOR AN ENTERPRISE COMPUTER SYSTEM

TECHNICAL FIELD

The disclosed teachings relate to a standardized graph-based framework for evaluating a computer system. More specifically, the disclosed teachings relate to a standardized graph-based framework for evaluating an enterprise computer system to maintain its operational efficiency while complying with restrictive policies (e.g., product licenses) enforceable by the enterprise computer system.

BACKGROUND

Modern computing environments have a myriad of different computer resources. An example of a computer resource is software or hardware. Examples of software include programs used to operate a computer. A user can access a computer resource that is enabled to operate with hardware and/or software. For example, access to software can be restricted by a software license, which enforces one or more policies that limit access to authorized users of authorized copies of the software. More generally, the functionality of a computer system is restricted by product licenses.

An enterprise computer system that deploys numerous computer resources struggles to remain compliant with policies that constrain use of the computer resources. For example, a licensing model can monetize the use of computer resources by limiting access to those computer resources. Accordingly, an organization seeks to only purchase a minimally sufficient amount of licensable rights to computer resources so that the organization can maintain efficiency while complying with product licenses. The alternative would be to purchase comprehensive licensable rights that go underutilized.

A license may restrict computer resources in a variety of ways. For example, a hardcoded license may actively block unauthorized access to licensed software. In another example, a hardcoded license may enable access to software features even though doing so would result in noncompliance. The users must then pay a charge for accessing the computer resources on-demand. In another example, an enterprise may have a dynamic user base that share limited access to computer resources for different tasks. As a result, low priority tasks may receive excessive access while high priority tasks go underserved, or users accustomed to one level of access are inconvenienced by a change in the enterprise's situation or circumstances. Thus, a benign restriction in one context may impose an onerous burden in another context.

SUMMARY

The disclosed embodiments include a computer-implemented technique for determining a license position of an enterprise computer system represented in a standardized graph-based framework. The technique includes obtaining information indicative of licensable products and enforceable licenses of an enterprise computer system, tabulating that information in a graph database, and constructing an enterprise infrastructure graph and a target element relationship pattern graph of the enterprise computer system based on the tabulated information in accordance with the standardized graph-based framework. Querying the standardized graph-based framework can determine an effect of a target element on a license position of the enterprise computer system by matching the target element relationship pattern graph to any subgraphs of the enterprise infrastructure graph. The technique can further include determining a license position of the enterprise computer system based on any matching subgraphs returned in response to the query of the standardized graph-based framework.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter. Other aspects of the disclosed embodiments will be apparent from the accompanying Figures and Detailed Description.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
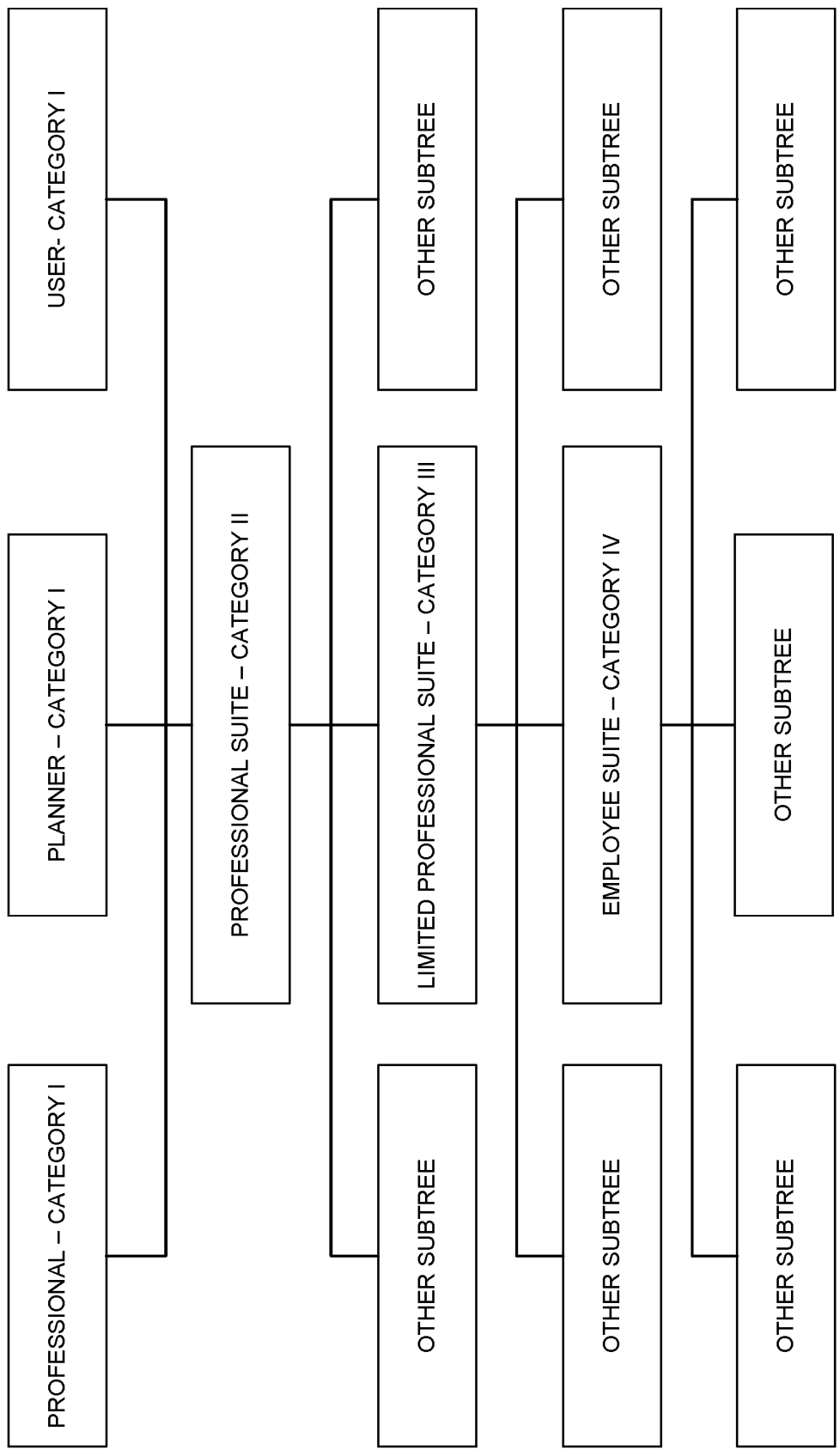
FIG. 1 is a block diagram that illustrates a hierarchical arrangement of license types deployable in an enterprise computer system.

The embodiments set forth below represent the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of the terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

As used herein, a "standardized graph-based framework" may refer to a framework for evaluating a computer system (e.g., an enterprise computer system) by using a graph database and related graph-based features. The standardized graph-based framework may be embodied as software and/or hardware, such as an algorithm stored on a non-transitory computer readable medium that, when executed by a processor, causes a computer to execute a process for evaluating a computing system in accordance with the standardized graph-based framework. The framework is "standardized" in the sense that the same framework of graphs used for describing licenses can be reused for different license models thus enabling one to make comparisons across license models.

The disclosed standardized graph-based framework is based on graph theory. The framework employs nodes, edges, and properties of a graph database. In the context of a standardized graph-based framework, a node may be similar to a record, relation, or row in a relational database, or a document in a document database. A node can represent an element associated with a licensable product such as a license model, license type, cost, enterprise asset, property, etc. A node could be understood in the context of a type of graph. For example, a property can be described in the context of an enterprise infrastructure graph. In a target-element match graph, nodes may represent a licensable product and user, along with a device that simultaneously has a licensable product installed and used by a user. In the enterprise infrastructure graph, a node may represent an instance of a matching username on a computer using an installation of a software application.

In the context of a standardized graph-based framework, an edge is a line that represents a relationship between two nodes connected by the edge. Edges are unique to graph databases, representing an abstraction that is not directly implemented in other types of systems (e.g., relational or document databases). In some instances, edges can imply a compositional hierarchy. Meaningful patterns can emerge when examining the connections and interconnections of nodes, properties, and edges. For example, in the context of an enterprise infrastructure graph, a relational edge named "serves client" may connect a device node labeled with a "server" property to other device nodes that have been discovered to receive data served by a licensable product running on a server (e.g., perhaps a license intends to constrain the number of these relations such that the edge would be the target element in this example).

In the context of the disclosed standardized graph-based framework, a property may refer to information that is germane to a node. For example, a license model node could be associated with a property such as a license model type. A property could be understood in the context of the enterprise infrastructure graph. For example, a node of the enterprise infrastructure graph might represent a user. A "last name" could be the label of a property of the user node, which is perhaps used to filter a user license type if the license model restricted the license to a user. In another example, a device node might have a "region" property used for similar forms of filtering. In yet another example, a processor node might have a "ProcModel" property that could be used to weigh license units calculated against that node.

As used herein, a "license unit" (LU) may refer to a quantifiable set of one or more restrictions on one or more computer resources of a computer system. For example, a license unit can be a policy that grants access to some components (e.g., functions) of a computing resource while denying access to other components. A license unit is typically associated with, or defined by, a cost unit (i.e., pricing). The functionality of a licensed product should comply with associated license units.

As used herein, an "asset" or "enterprise asset" (EA) may refer to a computer resource such as software, hardware, and/or any other real or logical computer resource. Examples of hardware include a device, processor, processor core, or any other physical resource. An enterprise asset can be represented as a node in an enterprise infrastructure graph.

As used herein, a "target element" (TE) may refer to one or more assets or a property of an asset that is subject to one or more license units. In other words, a target element could be any object against which a license is enforced. A target element can be represented as a node in an enterprise infrastructure graph.

As used herein, a "target element filter" may refer to a filter that can be applied to target elements. The target element filter can have one or more properties that are used to separate out target elements that have matching properties. For example, a target element filter can indicate a license type such that any target elements of a matching license type are sorted out from target elements of license types that do not match. As such, application of a target element filter would constrain a number of matching target elements.

As used herein, a "weighting function" of a target element may refer to a function that determines a weight value applied to a quantity of license units of a target element. In some instances, the intent of the weighting function is to make the weighted licensing units fungible so that optimization can proceed using a higher level of abstraction (i.e., no longer require downstream algorithmic steps to consider the weighting function or maintain relationships to the specific weighting function parameters).

As used herein, a "weighting function parameter" of a target element may refer to one or more target elements, a relationship, or property of a matched subgraph necessary to perform a function.

As used herein, a "license type" may refer to a description of a type of target element subject to a license unit, a target element filter, and/or a type of element weighting function for the license unit. Examples and descriptions of common license types follow.

An appliance license type is a license covering use of a specific piece of hardware, such as a hub, router, or PBX.

A user license type is a license that provides access to software by a specific number of users. All installations of the software will be counted but installations across multiple devices for the same user will be counted as one license consumption.

A concurrent user license type is a license that provides wider access to software but limits the number of simultaneous users using the software. It may include compliance enforcement capabilities. Typically, a concurrent license is "checked out" from a license server when the software is run, assuming a license is available. If no license is available, the requester experiences a denial of service.

A named user license type is a license that allows access to software by a specific number of named users. In some cases, these licenses can be transferred from one user to another. When a license is created, the license should be allocated to specific users. Only installations associated with allocated users are counted. For example, if the license is allocated to users Sam and Jan, the maximum installation count is two. Any other installations of the licensed software application are treated as unassigned installations. For example, if Alice has also installed the licensed application but has not been allocated to the license, her installation will not be shown against installations of this license.

An evaluation license type is a license that allows one or more users to install and use software for trial purposes. Evaluation licenses may be time limited, may offer limited functionality, or may restrict or mark output (e.g., some PDF writing software includes the name of the software on every PDF document produced from a trial version). After evaluation, a user may purchase a full license, uninstall the software, or (for time-limited trials) the software will simply no longer work.

A node locked license type is a license that allows access to software on a specific number of named computers. These licenses are usually for server applications such as database or VMware products. In some cases, these licenses can be transferred from one computer to another, usually by requesting a new license key.

An OEM license type is a license for software that is delivered with the hardware and is only for use on that specific hardware. These licenses are tied to the lifecycle of the hardware and typically cannot be transferred to other hardware.

A processor (per processor/CPU) license type is a license based on the number of CPU/processor sockets on which the software will run, and NOT the logical processors (i.e., cores).

A client-server license type is a server license that is based on a device metric. In many cases, this type of license may also have a client access license (or CAL) aspect. In a server/CAL model, a license must be purchased for the physical server (or virtual server) and also additional 'access' licenses must be purchased for any users/devices that may access the server for that application.

A runtime license type is a license that provides access rights to third party software embedded in an application. The use of the runtime license is limited to the application through which it has been acquired.

A site license type is a license to install software on an unlimited number of computers at one physical location.

A device license type is a license for a defined number of software installations. The software may be uninstalled on one computer and installed on any other computer within the same enterprise, so long as the total number of installations does not exceed the number of purchased licenses.

A core/processor points license type is a license based on points applied as a multiplier to the number of cores/processors in the physical server, or in some cases, the virtual machine. Some vendors count processor sockets and others count logical processors, or cores, but the license model is similar. For example, an application installed on a four-processor server with 100 points per processor would require a purchase of 400 processor points to cover the license liability. These licenses are mainly used for datacenter software licensing.

To recreate the processor points in the context of a standardized graph-based framework, suppose that a licensable product is running on a four-processor server. The target element relationship pattern may be licensable produce 4 server 4 processor. This target element relationship pattern would match that licensable product four times (i.e., one for each processor). To extend the example, the physical processor model (SpeedyProc or CalculonALU) might have a different number of processor points ascribed to it as defined in the license contract. This was not required for the pattern match, but this property of the processor would be needed to properly translate the number of processor points (a SpeedyProc gets three points, but a CalculonALU gets 2,999 points). Retrieving this property in the case of one SpeedyProc and three CalculonALUs would result in the four-processors being worth $(1)*3+(3)*2,999=9,000$ points.

An enterprise license type is a license to install software a finite or unlimited number of times within an enterprise. An enterprise agreement is structured in an "all you can eat" manner but the enterprise is usually licensed for a finite quantity of licenses such that this is not strictly an "enterprise license" model in its pure form. In some embodiments, an enterprise license type is default where there is no target element required to match.

Once license units are weighted, the license units are assumed to be interchangeable. That is, the parameters are the last bit of local or contextual information required before an abstraction is completed and a "total" can be tabulated without retaining where the license unit originated in the graph.

As used herein, a "license model" may refer to a model that describes how a license type incurs licensing costs.

As used herein, an "enterprise infrastructure graph" may refer to a dataset including licensable products, enterprise elements, interrelationships, and properties. In some embodiments, salient data elements gathered from a computer infrastructure of an enterprise can be organized into a graph topology for subsequent query and analytics. In tabulation systems, the "database" equivalent of the enterprise infrastructure graph may contain data relevant to the specific license models or contracts under consideration and may contain additional data (e.g., relevant evaluating other unrelated license contracts).

As used herein, a "target element relationship pattern" may refer to a mapping graph model (e.g., acyclic mapping graph model) with nodes that represent licensable product types, asset types, property types, and relevant relational intermediaries that span a relationship between a licensable product and the target element under a license model.

As used herein, a "matched subgraph" may refer to a subgraph of an enterprise infrastructure graph that matches a target element relationship pattern. Matched subgraphs can encapsulate instances of target elements that are subject to constraints identified by pattern matching instances on the enterprise infrastructure graph.

As used herein, a "licensable product star graph" may refer to a radial tree graph with a root node that represents a licensable product, surrounded by nodes that represent respective license models under consideration, and terminating in target elements, with subgraphs that match subgraphs to the licensable product.

As used herein, a "licensable product constellation graph" may refer to a graph constructed of a combination of licensable product star graphs with common target elements of the same license models as intermediaries that join the different licensable product star graphs.

As used herein, the term "installations" may refer to the number of raw software installations without product use rights or license metrics applied.

As used herein, the term "entitlement" may refer to the number of purchased licenses available combined with any contractual or product-use rights.

As used herein, the term "consumed" may refer to the actual license liability (i.e., not installs). Consumption is the install count applied against the entitlement.

As used herein, the term "compliant" may refer to when the number of licenses consumed is less than or equal to the number of licenses purchased.

As used herein, the term "breach" may refer to when the number of licenses consumed is more than the number of licenses purchased.

As used herein, the term "delta" may refer to the difference between the number of licenses consumed and the number purchased (e.g., ten licenses purchased and fourteen consumed would result in a delta of four).

General Overview

An organization (e.g., enterprise) typically relies on a disparate collection of products associated with various restrictive policies (e.g., licenses). For example, commercial software products include various software solutions under different licensing terms. An enterprise that deploys software products may be subject to a restrictive policy such as a license ratio condition that indicates a maximum ratio of two license types. For example, a restrictive policy for license types A and B of 1:4 requires four times as many B licenses as A licenses in effect at any point in time during the period while this policy is enforced. As a result, an enterprise may be responsible for ensuring that the number of licenses that have been purchased complies with the restrictive ratio. A license may require the enterprise to purchase an additional license to ensure that the restrictive ratio is maintained. Thus, a license may reflect an ongoing obligation rather than solely an initial purchase of a license.

In some embodiments, different license types represent different ways of determining license units. This could be by assigning roles to different users as described in user license type licenses. For example, a license may be ordered based on levels of license types in a hierarchy. A particular license type may allow access to greater amounts of functionality within a license hierarchy. Further, a license may grant a higher priority to one license type compared to another license type. A license type hierarchy may represent an amount of functionality of a computer resource that a user can access in accordance with a license type. An example of a license type hierarchy is illustrated in FIG. 1. As shown, the blocks represent different license types. The highest priority licenses are indicated at the top of the hierarchy with increasingly less prioritized licenses below.

Figure 2:
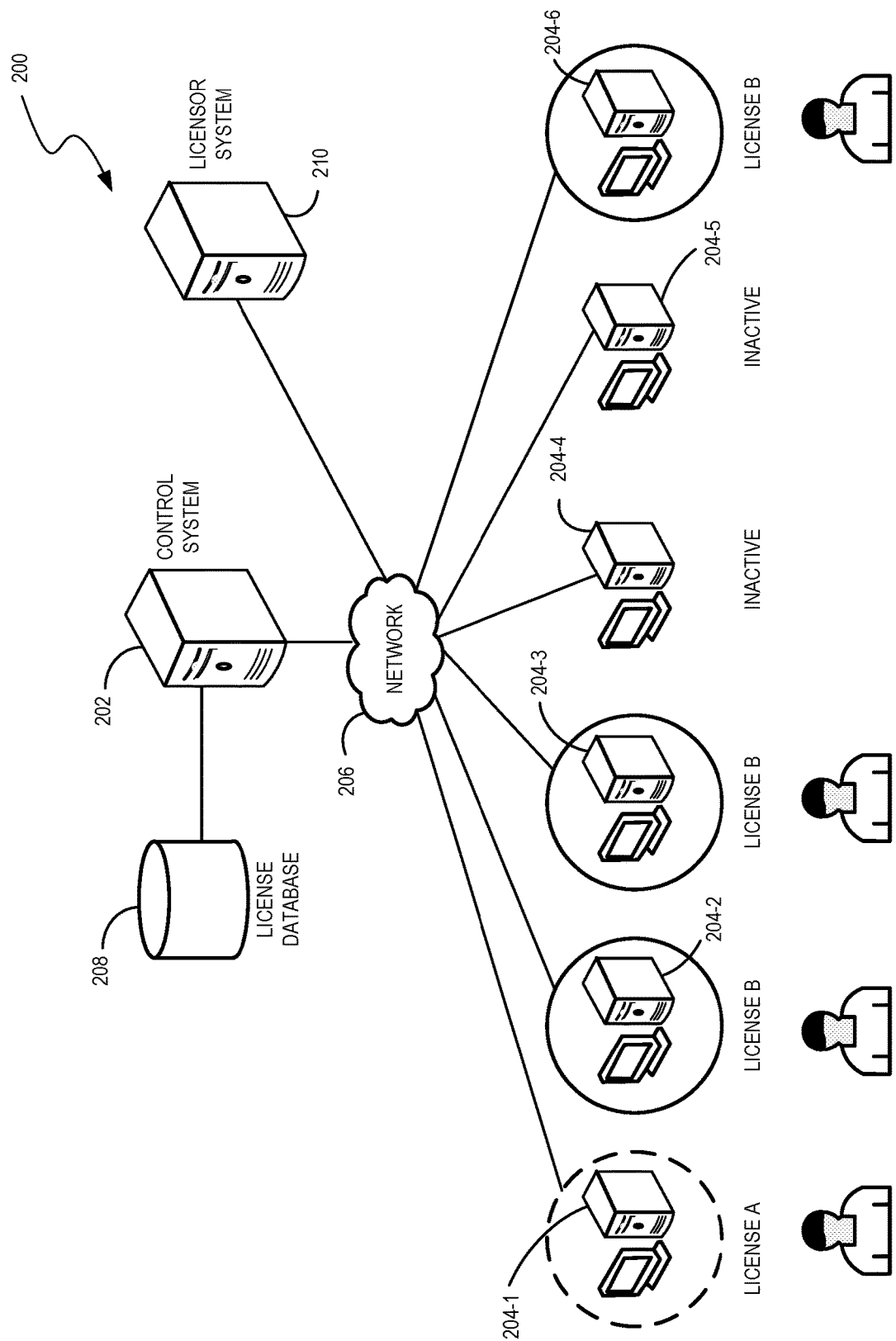
FIG. 2 is a block diagram that illustrates an enterprise computer system topology including licensable products on which licenses are enforced.

FIG. 2 is a block diagram that illustrates an enterprise computer system 200 including licensable products on which licenses are enforced. A control system 202 may run agents (e.g., monitoring programs, sensors) that coordinate license assignments for clients 204-2 through 204-6 across a network 206. A license database 208 may include information indicating terms imposed by license providers and the enterprise computer system. For example, access to licensable software or services from a licensor system 210 may be predicated on compliance with a license.

In some instances, ratios may have been used to compare license units of one license model to the quantity of license units required by another license model to determine which would eventually be lowest in cost.

For example, a license may mandate a maximum ratio of licenses A:B=1:2. At the point in time depicted in FIG. 2, clients 204-1, 204-2, 204-3, and 204-6 are in use while clients 204-4 and 204-5 are inactive. The client 204-1 could employ license A while clients 204-2, 204-3, and 204-6 employ license B and remain compliant because the license ratio of 1:3 satisfies the restrictive ratio. However, the client 204-4 cannot instantiate a software or service under license A because the resulting ratio would exceed the restrictive ratio. If the client 204-4 instantiates license B, a user subsequently initiating a session on the client 204-5 may have the choice of using either license A or B because instantiating either would comply with the mandated ratio. Complications can arise, however, when users close instances. For example, a user engaged in a session under license A may suddenly be required to transition to license B if a sufficient number of license B sessions are closed. Accordingly, the control system 202 can coordinate the application and/or enforcement of licenses to optimize compliant usage. In some embodiments, the licensor system 210 may be integrated with the network such that licenses are properly maintained in an effective manner. Although depicted as single devices, the control system 202 and/or licensor system 210 could be distributed among computer systems.

Figure 3:
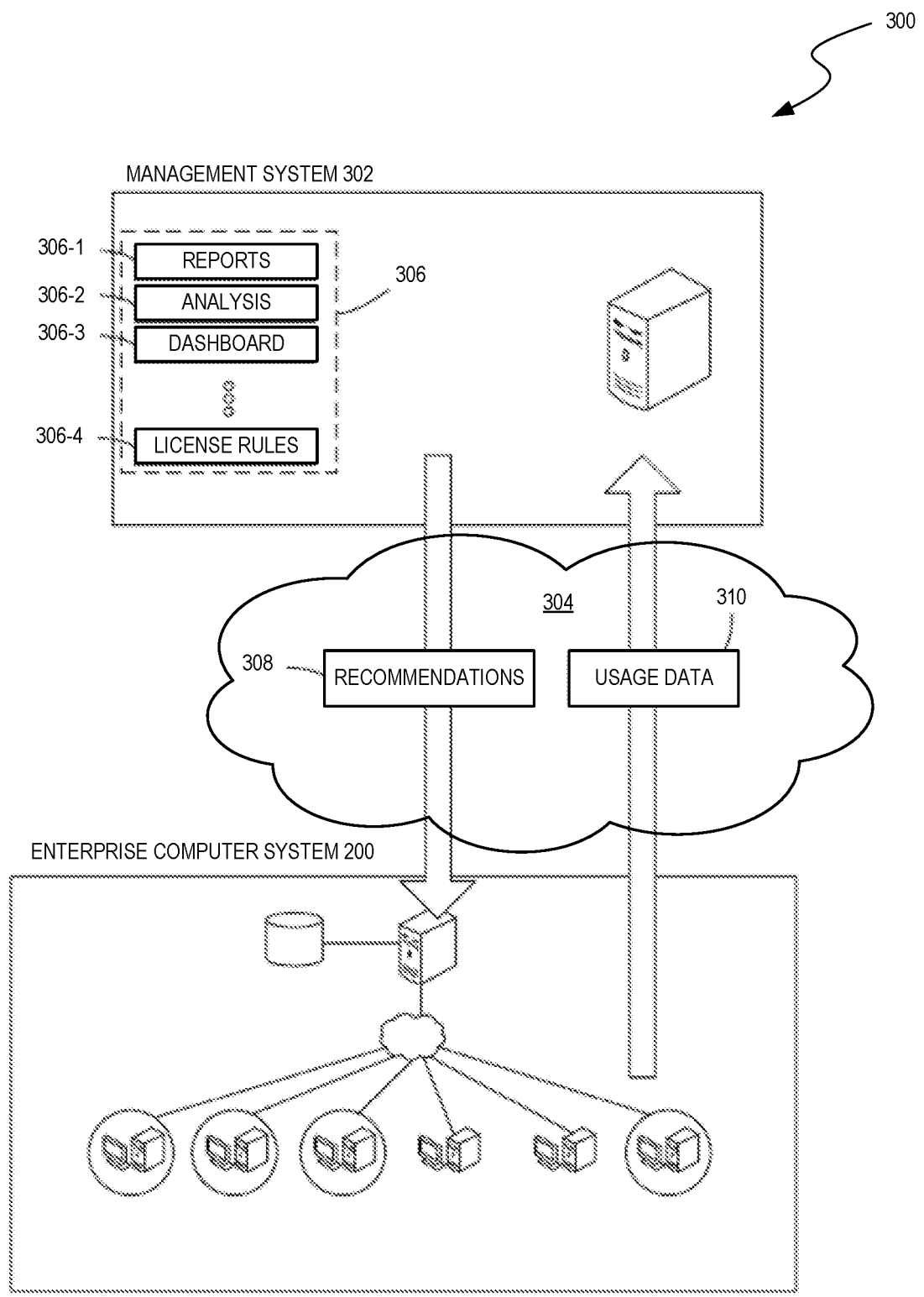
FIG. 3 is a block diagram that illustrates a system topology including the enterprise computer system of FIG. 2 connected to a management system operable to optimize license assignments.

FIG. 3 is a block diagram illustrating a system topology 300 including the enterprise computer system 200 of FIG. 2 connected to a management system 302 collectively operable to optimize license assignments. The management system 302 may be local or remote from the enterprise computer system, which can communicate with the management system 302 over a network 304. The management system 302 includes information and tools 306 for generating reports 306-1, analyzing results 306-2, a graphical user interface dashboard 306-3, licensing rules 306-4, etc.

The policies implemented by the management system 302 may be used to derive recommendations 308 from the tools 306 of the management system 302. The enterprise computer system 200 may report usage data 310 to the management system 302 at various points in time, which may be used to supplement information used by the tools 306. Thus, the enterprise computer system 200 may be managed by the control system 202, which may itself interact with the management system 302 to optimize the behavior of the enterprise computer system 200. In some embodiments, the control system 202 may include the management system 302.

Determining a License Position with the Standardized Graph-Based Framework

The disclosed embodiments include a technique for describing a license in a generalized way that is usable to optimize a computer system. An enterprise computer system typically has a number of licensable products that are accessible over a number of networks by a number of clients. An example of a licensable product is a computer resource including hardware (e.g., server, client), software (e.g., application, operating system), or any combination or a portion thereof of the enterprise computer system.

Although embodiments are generally described in the context of an enterprise computer system, the disclosure is not so limited. Instead, the embodiments could include any licensing system where the quantity of units of a license are measurable directly or indirectly. The utility of describing licenses in this way is that license units may be compared.

The total number of licensed products of an enterprise computer system denote a "license position" at a point in time. Specifically, a license position may refer to a measure associated with a situation or set of circumstances indicative of consumed licenses by licensable products of an enterprise computer system. For example, an enterprise may have purchased a combination and count of licenses but use a different combination and/or count of licenses. In some embodiments, a license position is defined by the delta between what the enterprise had paid for and what the enterprise uses.

A license position may refer a portion of the enterprise computer system (e.g., group, region). However, any unincluded portions with licensable products covered by the same license would result in an incomplete understanding of coverage. For example, consider the case of two license models being compared, one of which has a significant portion of licensable products contained in an unevaluated section. The failure to tabulate these licenses could mislead an enterprise to under-report the quantity of licenses used. It could cause the enterprise to undersubscribe for future licenses. And it could cause the enterprise to improperly undervalue the cost of selecting the under-represented license model when comparing license models.

A license position typically defines a static relationship between one or more licenses and one or more licensable products. The basic premise of forming a license position involves comparing entitlements with deployments. Establishing a license position may require taking full inventory of software or hardware assets and comparing them against license documentation and installations. This allows an enterprise to determine where it may be over- or underlicensed, which presents opportunities for improvements in license compliance. A license position is effective as a step toward software asset management, not as a standalone process. Once a license position has been established based on entitlements versus installations, an effective optimization strategy can be determined.

A license position is often used in the context of an enterprise complying with the terms of a license contract. In the case where the enterprise may be audited for oversubscription, the term can imply not just a total count but a qualitative state (in/out) of compliance as well. For example, assume the industry calls it a total count. For this disclosure, the count is weighted as needed to adjust for instances which incur more consumption of licenses than other instances.

Therefore, to adequately support an enterprise computer system, the enterprise needs to determine its current or prospective license position. That is, the enterprise needs to determine a measure of its consumption of licenses by licensable products required to support the enterprise computer system while remaining compliant. However, an actual license position and associated costs for the license position are typically unknown because an enterprise has a combination of diverse licensable products. Moreover, the enforced licenses for licensable products are typically static even when an enterprise computer system is dynamic. As such, the static licenses are readily underutilized or are breached. Accordingly, the inability to accurately determine a license position results in inefficiencies due to mismatches between licenses and the use of licensable products on which the licenses are enforced.

Existing license positioning software uses hardcoded algorithms that can be employed to determine the license position and associated costs to an enterprise computer system. These hardcoded algorithms have limited use to determine a license position and associated costs for a specific situation or set of circumstances of an enterprise computer system at multiple points in time. For example, existing license positioning software cannot readily accommodate routine changes of an enterprise computer system.

In some embodiments, the disclosed system can dynamically perform optimization in real-time or near real time, where the term "dynamic" refers to time instead of being configurable. In some embodiments, the disclosed license positioning technique can monitor licensable products of an enterprise computer system and changed situations or circumstances to dynamically identify a new license position, diagnose mismatches of license positions, and adapt a current arrangement of licenses based on the diagnosed mismatch. For example, an improved license positioning software can employ the disclosed graph-based framework to analyze an existing enterprise computer system in real-time or near real-time, determine a current license position, and recommend a more suitable arrangement of licenses based on a current situation or circumstances of the enterprise computer system.

In some embodiments, the disclosed dynamism involves producers of software that create new licensing models as technology changes. An enterprise would need to update the system that tabulates and optimizes licenses to handle these new contracts. Systems for the tabulation of software licenses require recompilation to support these new license types. A properly designed tabulation system would allow the enterprise to specify, into the tabulation and optimizing software, additional license types when enumerating the license models that apply to the enterprise.

The disclosed license positioning technique removes the dependence on rigid, statically designed license positioning code of prior systems. Instead, for example, an improved license positioning software can generate a measure of consumption of license units in order to automatically and dynamically adjust licensable products or deploy licenses to support existing demands while remaining compliant with licenses. Accordingly, an enterprise could readily handle more diverse and complex licensing rules while reducing internal code redundancy. For example, the rules implemented by the improved license positioning software can be generated at runtime, instead of being hardcoded and risk being unsupported as circumstances change. Further, improving the ability to readily determine a license position facilitates the ability to accommodate more elaborate licensing models.

The disclosed technique for determining license positions and associated costs is based on a standardized graph-based framework. For example, an improved license positioning algorithm could employ a graph database that uses graph structures for semantic queries with nodes, edges, and properties to represent and store data. A distinctive concept of the disclosed technique is the graph (or edge or relationship), which directly relates data items in a datastore. The relationships allow data in the datastore to be linked together directly and can be retrieved with one operation.

Alternatively, relational databases permit management of data without imposing implementation aspects like physical record chains. For example, links between data are stored in the relational database at a logical level, and relational algebra operations (e.g., joins) can be used to manipulate and return related data in a relevant logical format. The execution of relational queries is possible with the aid of the database management systems at the physical level (e.g. using indexes), which permit improved performance without modifying the logical structure of the relational database.

The standardized graph-based framework allows for a simple and fast retrieval of complex hierarchical structures that are difficult to model with relational systems. As such, enterprises can readily calculate license positions and associated costs using the disclosed standardized graph-based framework to handle different license types. The standardized graph-based framework can be used to calculate a license position and associated costs in a generalized way by monitoring relationships of computer resources, license type characteristics, costs of license models, etc. For example, the standardized graph-based framework can determine interrelationships of computer resources for mapping license models, and determine weights associated with the licensing costs and characteristics.

A graph database may be better suited for determining a license position and associated costs compared to implementing a relational database. For example, compared to relational databases, graph databases are often faster for associative data sets and map more directly to a structure of object-oriented applications. Graph databases can scale more naturally to large data sets because they do not typically need costly join operations when executed on databases with non-optimal designs at the logical and physical levels. Thus, graph databases are more suitable to manage ad hoc and changing data with evolving schemas rather than the rigid schemas of other systems. Conversely, relational database management systems are typically faster at performing the same operation on large numbers of data elements, permitting for the manipulation of the data in its natural structure.

The standardized graph-based framework offers improved performance because the highly connected data of license assignments can cause numerous joins, which are generally more computationally expensive in other systems. For example, a relational database is slower at executing several self or recursive joins compared to a graph database. The standardized graph-based framework is also more flexible. For example, graph data is not forced into a structure like a relational table and attributes can be readily added and removed. The standardized graph-based framework also enables easier data modeling because it is not bound by a predefined structure. Another advantage of the standardized graph-based framework is that query syntax becomes complex and large as the joins increase in a relational database, which can be the case when determining a license position and associated costs, and the graph database reduces this complexity. In addition, graph databases are also a powerful tool for graph-like queries such as, for example, computing a shortest path between two nodes in the graph. Unlike SQL queries, graph-like queries can be performed over a graph database in a natural way (e.g., graph's diameter computations or community detection).

The underlying storage mechanism of the standardized graph-based framework can vary depending on a relational engine used to store graph data in a table. A table is a logical element that imposes a level of abstraction between a graph database, a graph database management system, and the physical devices where the data is stored. In some embodiments, a key-value store or document-oriented database is used for storage, making them inherently NoSQL structures. Graph databases based on non-relational storage engines can also add properties, which represent relationships having a pointer to another node. This allows volumes of data elements to be categorized for easy retrieval.

Retrieving data from a graph database of the standardized graph-based framework requires a query language other than SQL, which is designed for manipulating data in a relational system and therefore cannot readily handle traversing a graph. In some embodiments, a graph query language can be used in the same way as SQL is for relational databases. In some embodiments, the graph databases can be accessed via query language interfaces or application programming interfaces (APIs).

A relational model gathers data together using information in the data. For example, data may be filtered for an attribute. This is done by searching selected data-stores, or tables, and looking in certain fields for a search string. This can be a time-consuming process in large tables and, as such, relational databases use an index, which allows data like this to be stored in a smaller sub-table that contains only the selected data and a unique key of its record. If the filtered data items are indexed, the same search would occur in the smaller index table, gathering the keys of matching records, and then looking in the main data table for the records with those keys. The tables are generally physically stored so that lookups on these keys is fast.

Relational databases do not necessarily contain relationships between records. Instead, related data is linked to each other by storing one record's unique key in another record's data. For example, a table containing user data might hold a data item that contains a primary key of its associated user record. In order to link users and their user data, the system looks up the selected user records' primary keys, looks for those keys in the particular table (e.g., index), extracts the user data, and then links to the user and user data to make composite records containing all the selected data. This join operation is computationally expensive. Depending on the complexity of the query, the number of joins, and the indexing of various keys, the system may have to search through numerous tables and indices, gather volumes of information, and then sort it all to match it together.

In contrast, a graph database can inherently store relationships between records. Instead of a user's data being found by looking up its user's key, the user record contains a pointer to the user data record. Hence, having selected a user, the pointer can be followed directly to the user data without a need to search an index to find matching records. This can eliminate costly join operations. For example, if one searches for all of a particular data item for users filtered by a particular attribute, the search engine would first perform a conventional search to find the users with that attribute but then retrieve the particular data items by following the links found in those records. In contrast, a relational database would first find all the users with that attribute, extract a list of the unique keys, perform another search for any records in an index with those keys, and link matching records together. Accordingly, a graph database can be computationally more efficient and faster when performing these operations compared to a relational database.

The benefit of using the graph-based approach becomes more evident when performing searches that are more than one level deep. For example, consider a search for users who have a first particular data item with an attribute. In this case, a relational database has to first lookup all the users with the particular attribute, then look in a table of the particular data item for any of those users, and then finally look in the users table to retrieve matching users. In contrast, a graph database would look for all the users with the attribute, then follow the back-links through the data items' relationship to find the users. This avoids several searches, lookups and memory involved in holding all of the temporary data from multiple records needed to construct the output. The advantage of graph retrieval operations increases with the complexity of a query. In particular, the same retrieval operations in a graph database could require several separate searches in a relational database.

Properties add another layer to the standardized graph-based framework that improve many queries commonly performed in relational databases. Properties are labels that can apply to a node or an edge. The use of properties allows the system to quickly find all records having a property. If labels on edges are allowed, one could also label the relationship between nodes to improve the performance of search operations. The equivalent SQL query would have to rely on added data in a table linking data items, which adds more complexity to the query syntax. Accordingly, properties can improve search performance under certain circumstances and are useful in providing added semantic data for users. Further, relational databases are well suited for flat data layouts where relationships between data is only a few levels deep. In contrast, graph databases are aimed at datasets that contain many more links. These characteristics make graph databases well suited to the types of searches required for optimizing a license position of an enterprise computer system.

Figure 4:
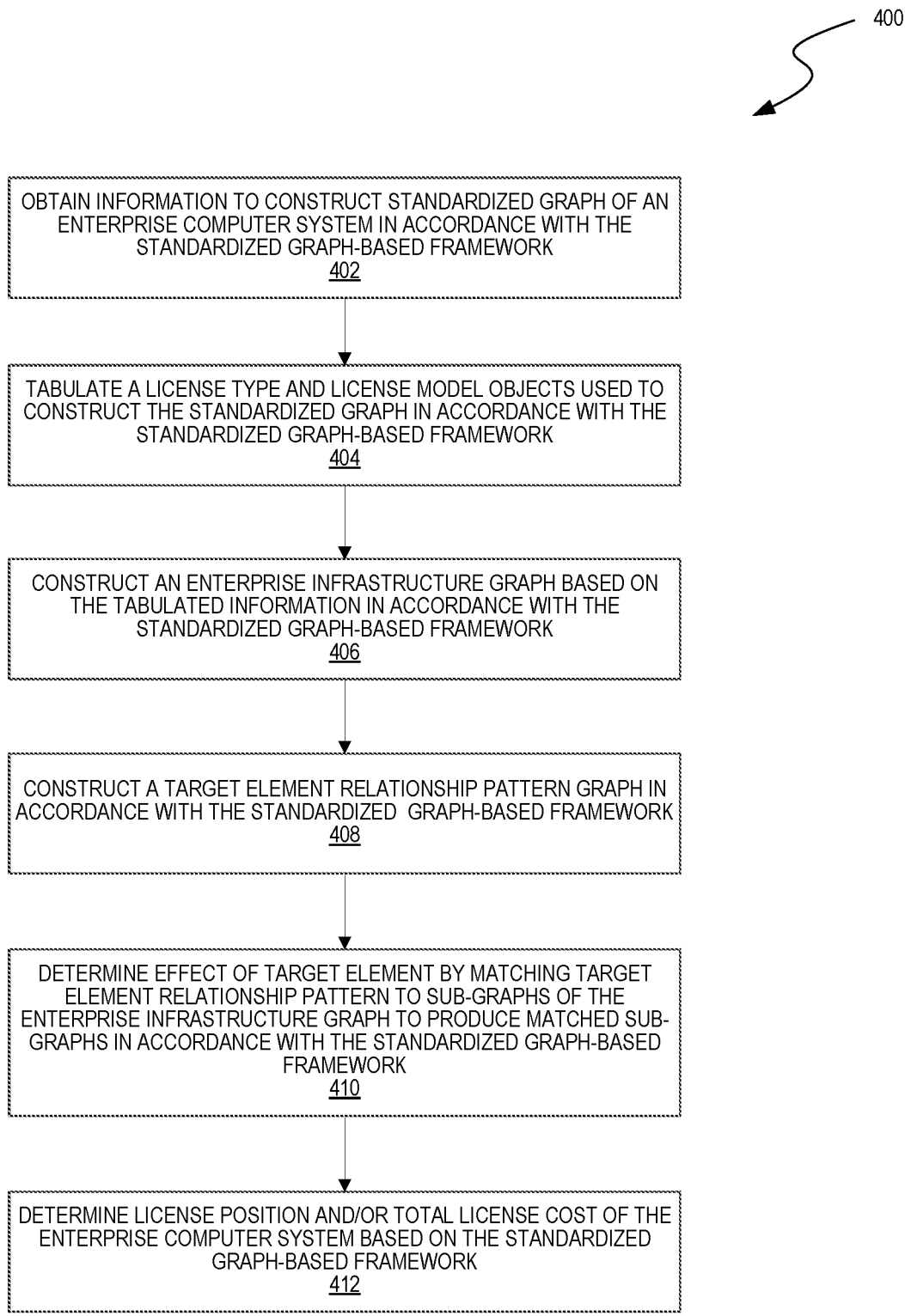
FIG. 4 is a flowchart illustrating a process for generating a standardized graph of an enterprise computer system in accordance with a standardized graph-based framework.

FIG. 4 is a flowchart illustrating a process for generating a standardized graph of an enterprise computer system in accordance with the disclosed standardized graph-based framework.

In step 402, information is obtained to construct one or more graphs of the enterprise computer system in accordance with the generalized graph-based framework. In some embodiments, the information may be available or derivable from other information indicative of an enterprise computer system. For example, an enterprise's computer system can be routinely monitored with software agents that extract relevant data, or the relevant data could be obtained by performing a diagnostic procedure on the enterprise computer system. In some embodiments, information can be obtained from the producer of any licensable product, which typically creates the corresponding license with terms that define how to measure consumption of the license, including a definition of a license unit and associated price for its consumption. Specifically, the producers can create license contracts that describe the terms of how to count a consumption of a licensable product and pricing for that count. This information can be input to the standardized graph-based framework to generate one or more standardized graphs for the enterprise computer system.

In step 404, information of the license type and license model objects are tabulated to generate a standardized graph of an enterprise computer system. For example, a license model can be defined for the enterprise computer system. A license model includes a pricing description as well as a description of a license type. A license type can denote an enterprise asset type, an enterprise asset property type, and/or a relationship type of an enterprise computer system that can be used as a target element to determine a license position and related outputs. For example, a specified target element can be used to calculate a license units quantity to be billed. In another example, a license type can describe a pattern indicative of relationships that tie a target element with a licensable product. As described further below, target elements may be filtered by any number of properties (e.g., sub-type, sub-property). Further, a license type may include a description of a target element weighting function to modify target elements for conversion into license units.

Figure 5:
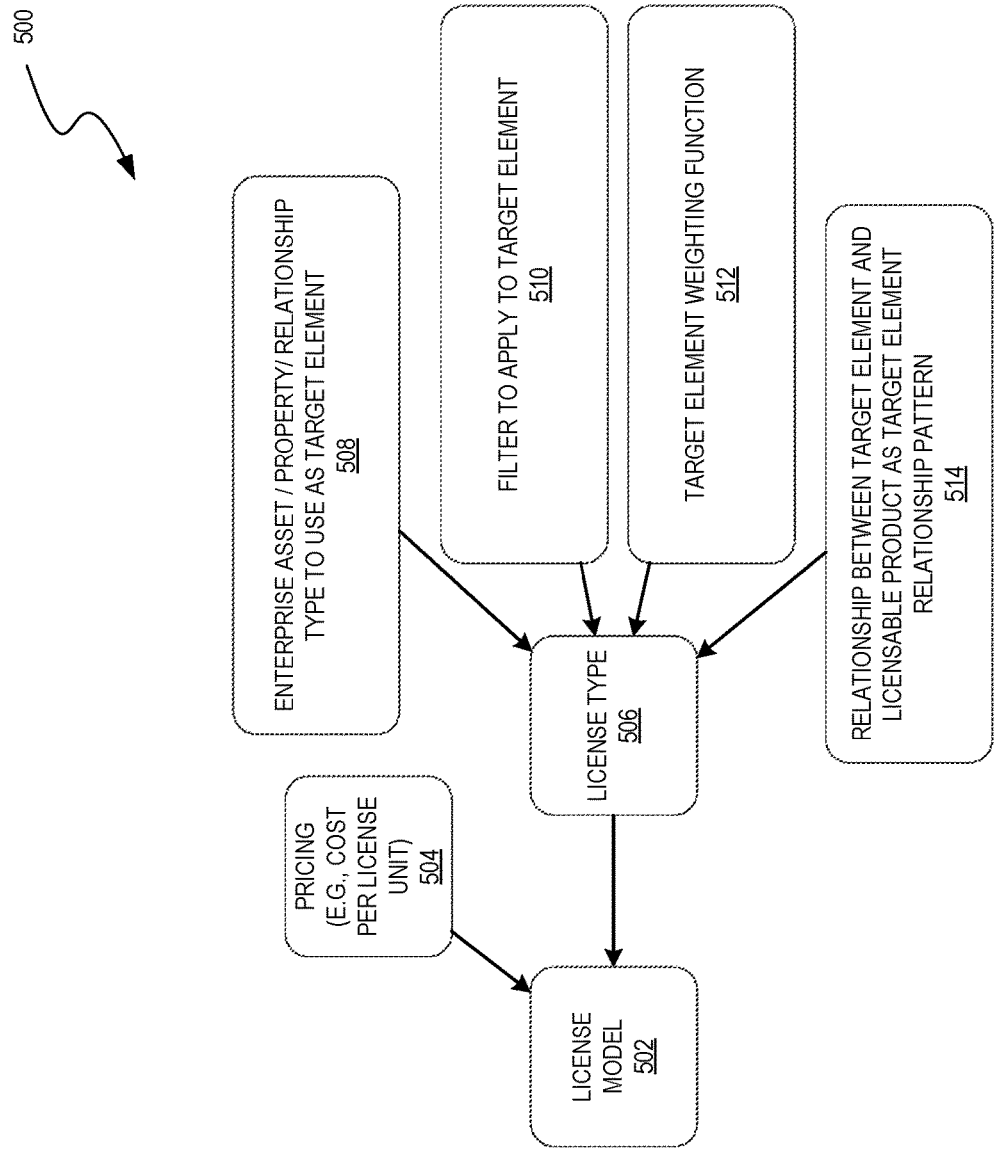
FIG. 5 is a block diagram that depicts a logical composition of a license type and license model objects.

To aid in understanding, FIG. 5 is a block diagram that illustrates a logical composition 500 of license type and license model objects. As shown, a license model 502 is composed of license model objects. The license model 502 includes a description of a pricing 504 (e.g., cost per license unit) as well as a license type 506. The license type 506 includes potential target elements 508 such as an enterprise asset, property, and/or relationship type that can be selected as a target element for calculating a quantity of license units to be billed. The license type 506 can have a target element filter 510 that can be applied against the target elements of the license type 506. For example, the target element filter 510 may define sub-types or sub-properties used to filter target elements. The license type 506 can also indicate a target element weighting function 512, which can be used to normalize target elements for conversion into license units. The license type 506 can also include a target element relationship pattern 514, which describes relationships between target elements and the licensable product.

Referring back to FIG. 4, in step 406, an enterprise infrastructure graph is constructed in accordance with the standardized graph-based framework based on, among other things, the tabulated licensable products, enterprise assets, interconnecting relationships, and/or properties of the enterprise computer system.

Figure 6:
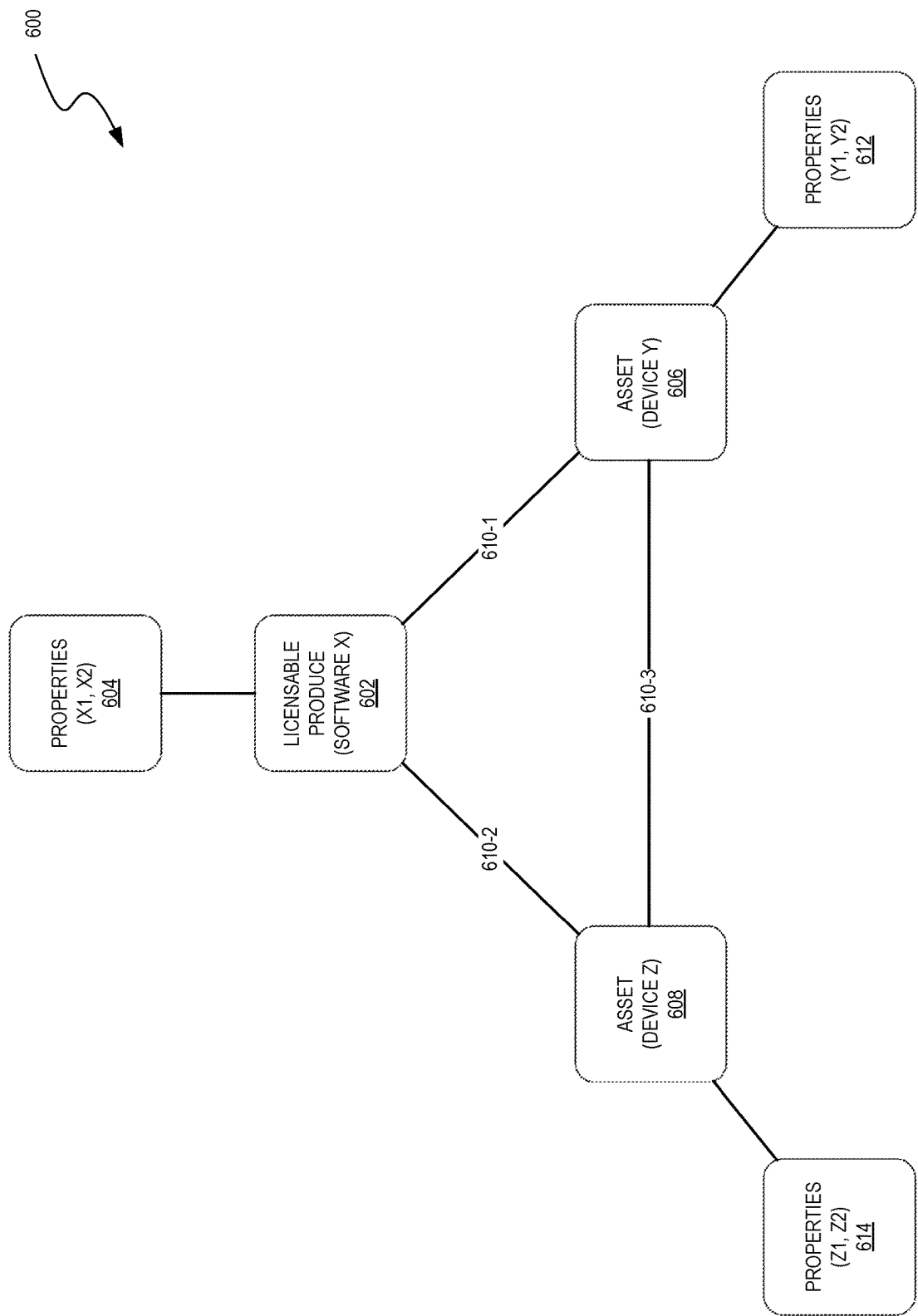
FIG. 6 is a block diagram that illustrates an example of an enterprise infrastructure graph constructed in accordance with the disclosed standardized graph-based framework.

FIG. 6 is a block diagram that illustrates an example of an enterprise infrastructure graph 600 constructed in accordance with the standardized graph-based framework. The enterprise infrastructure graph 600 illustrates raw data of the enterprise without any licensing or pattern matching context. The software X is a licensable product 602 that was discovered and is represented as a central node. The licensable product 602 is connected to a node that represents properties 604 (e.g., X1, X2). The licensable product 602 was discovered to have relationships with asset 606 (e.g., device Y) and asset 608 (e.g., device Z). The edge 610-1 represents a relationship between licensable product 602 and asset 606. The edge 610-2 represents a relationship between licensable product 602 and asset 608. The edge 610-3 represents a relationship between asset 606 and asset 608. The asset 606 is connected to a node that represents its properties (e.g., Y1, Y2). Lastly, the asset 608 is connected to a node that represents its properties (e.g., Z1, Z2).

Referring back to FIG. 4, in step 408, a target element relationship pattern graph is constructed in accordance with the standardized graph-based framework. In some embodiments, a target element relationship pattern graph can be predefined and matched to a license type of a license model. In some embodiments, a target element relationship graph can be constructed directly from parameterized entries of a license type to improve flexibility. In graph form, a target element relationship pattern describes a path from a licensable product to the graph element type used as a target element type, and any paths to any graph elements used as target element filter parameters or target element weighting function parameters.

Figure 7:
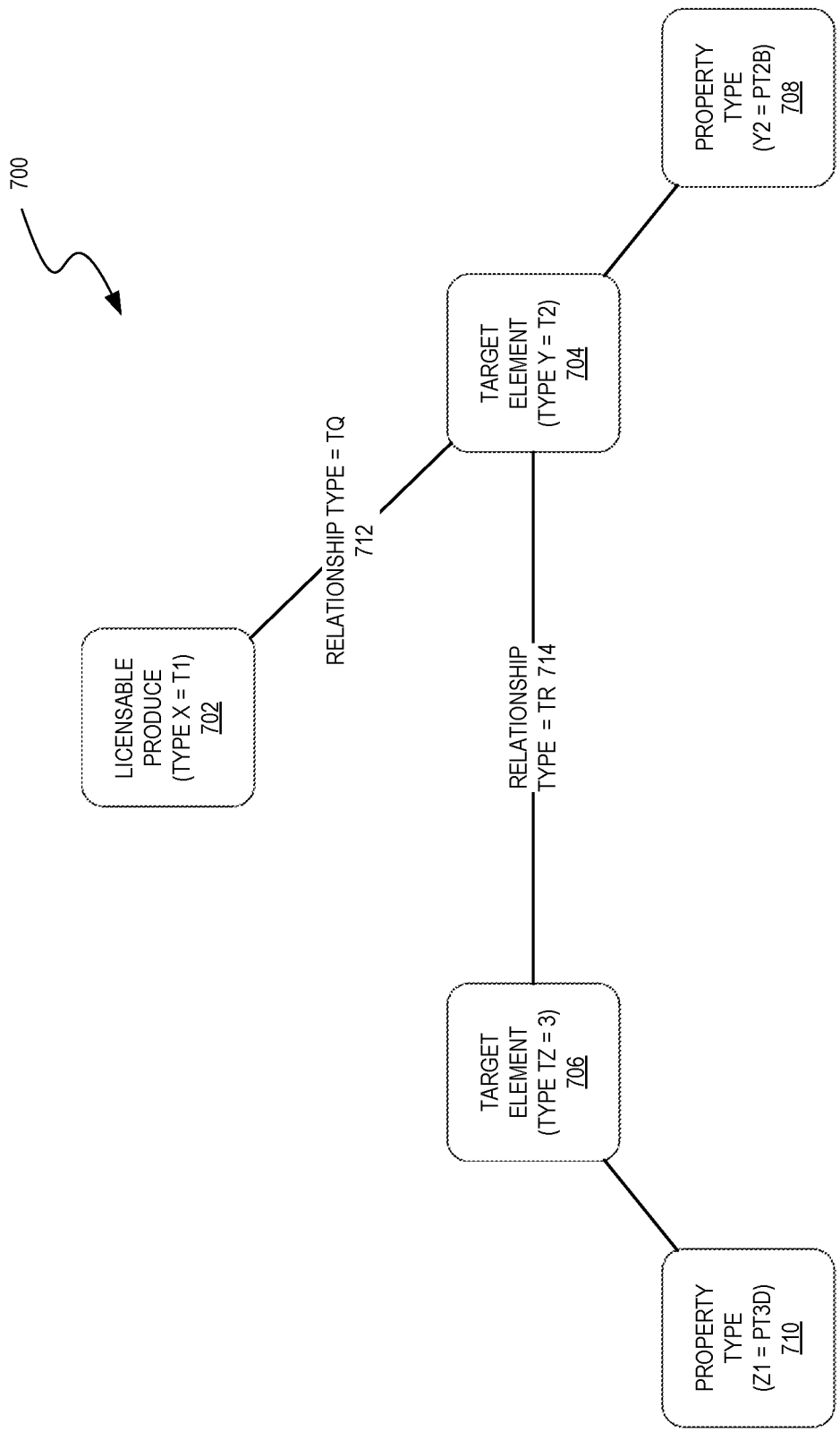
FIG. 7 is a block diagram illustrating an example of a target element relationship pattern constructed in accordance with the disclosed standardized graph-based framework.

FIG. 7 is a block diagram that illustrates an example of a target element relationship pattern 700 constructed in accordance with the disclosed standardized graph-based framework. The target element relationship pattern 700 specifies type information, which indicates an abstract case to be applied to an enterprise infrastructure graph rather than an instance of a specific case. An asset relationship graph can follow from matching the target element relationship graph to the enterprise infrastructure graph.

As shown, the target element relationship pattern 700 depicts a relationship path from a licensable product 702 to another graph element that represents a target element. The licensable product 702 is of type X=T1. An edge 712 representing a relationship of a first type (TQ) connects the licensable product 702 to a target element 704 of type Y=T2. Another edge 714 representing a relationship of a second type (TR) connects the target element 704 to a target element 706 of type Z=T3. Moreover, each target element 704, 706 has an edge that connects to an associated property type. That is, the target element 704 is associated with property type 708 (Y2=PT2B), and the target element 706 is associated with property type 710 (Z1=PT3D).

Product use rights can be considered as part of a match pattern. For example, a license may specify a user license type with roaming use rights as shown in FIG. 7. The software X (e.g., licensable product 702) is allowed to be run by a user Z (e.g., target element 706) on device Y (e.g., target element 704. In this example, the edge 712 is specifically of type "is run on" and edge 714 is specifically of type "operates." As such, to map this specific example to FIG. 7, TQ is a symbolic placeholder for the edge type "is run on" and TR is a symbolic placeholder for the edge type "operates" (where T3=user and T2=device).

Referring back to FIG. 4, in step 410, a target element relationship pattern graph is matched to any subgraphs of an enterprise infrastructure graph, and filtered by the target element filter to produce matched subgraphs. That is, the graph query code can be used to match and return a subgraph. In particular, the graph query code is constructed programmatically and logically to represent a target element relationship pattern. This is applied to an enterprise infrastructure graph, preferably by using a graph database, to return one or more matching subgraphs. Each matching subgraph returned by the standardized graph-based framework is analyzed to determine a quantity of license units incurred by the enterprise computer system. This yields any target element's effect on license units. For most license types, the target element's effect on license units will be analyzed only once, despite being an element of numerous matching subgraphs.

An example of a graph query to match and return a subgraph follows:

```
MATCH (LicensableProduct {type: "T1"})-[Rel1 {type:"TQ"}]
  - (EA1 {type:"T2"})-[Rel2 {type:"TR"}]
    -(TargetElement {type:"T3"})
WHERE EA1.Prop2Type = "PT2b" and EA3.Prop1Type = "PT3d"
RETURN LicensableProduct, Rel1, EA1, Rel2, TargetElement) as
SubGraph
```

In some embodiments, more complex license types may specify multiple licensable products and/or target elements. The additional target elements may be combined into a single target element relationship pattern or equivalent code using set logic to improve efficiency. In some embodiments, a relational database could be used rather than a graph database. However, the graph database may have certain advantages compared to relational databases as described elsewhere in this disclosure.

In step 412, a license position of the enterprise computer system is determined in accordance with the generalized graph-based framework. In some embodiments, the license position is determined as the sum of all license units obtained from the matched subgraphs. In some embodiments, a target element weight function is applied as specified by a license type. In other instances, a license type may apply no weight. In some embodiments, a license type may have complex lookup functions to match target element weight function parameters associated with an instance of a target element to determine a final license unit value. An example of a calculation to determine a license position follows:

$$\text{License Position} = \left( \sum_{i=1}^{SubGraphs} TEWeightFunction(TargetElement(i), Parameters(i)) \right)$$

An example of a calculation to determine a total license cost follows:

Total License Cost=LicensePosition*CostPerLicenseUnits

Determining Equivalent License Unit Metric

The standardized graph-based framework used to determine a license position of an enterprise computer system could be extended to determine an equivalent license unit cost. In particular, the graph-based process of FIG. 4 can be extended to construct and traverse superstructures referred to as a licensable product star graph (LPSG) and a licensable product constellation graph (LPCG). These constructions represent minimal groupings on which license optimizations can occur, thereby reducing combinatorial complexity compared with evaluating all elements in an enterprise in unison.

There are often several possible ways to license products in an enterprise computer system. For example, a computer resource could be licensed according to different licensing models that authorize access to some functional components and not others, grant access on a per use or user basis, etc. Given the variability associated with licensing the same computing resource, an enterprise may desire to objectively compare two or more licensing options to determine which offers the best value in terms of providing operational efficiency at a given cost. In fact, it would be beneficial to predict, given multiple possible license models, a cost per license unit under different license models. That is, it would be beneficial to construct an underlying cost for comparing different license models. The resulting cost could serve as a threshold to evaluate if alternative licensing models can provide operational efficiency at different relative costs.

As such, the disclosed embodiments enable an enterprise to compare licenses with different terms for the same computer resource. In some embodiments, the disclosed technique can include a mechanism for calculating an equivalent license unit cost across different license models for the same one or more computer resources.

Figure 8:
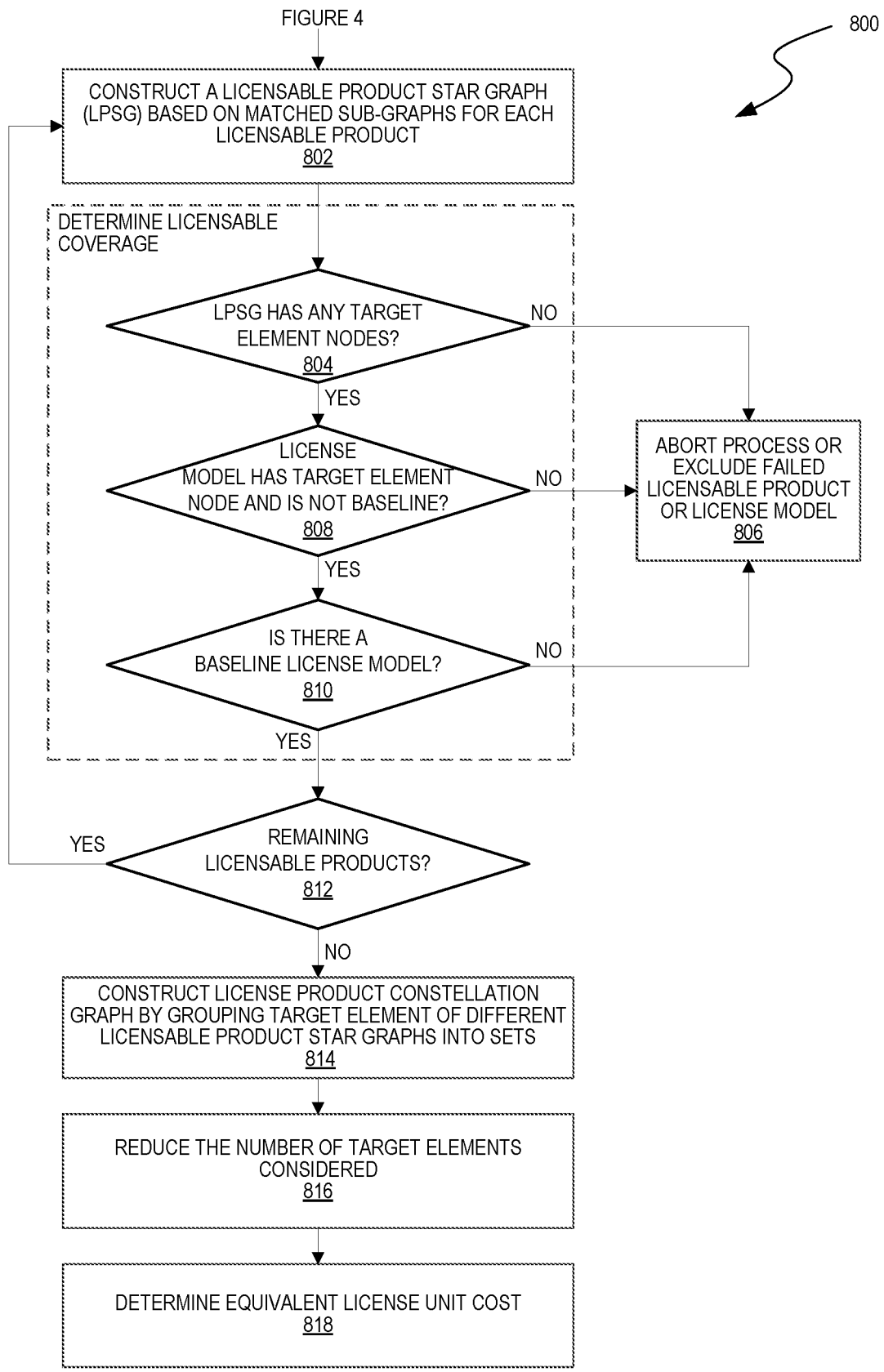
FIG. 8 is a flowchart for a process to determine an equivalent license unit cost in accordance with the disclosed standardized graph-based framework.

FIG. 8 is a flowchart of a process to determine an equivalent license unit cost as an extension of the standardized graph-based framework. For example, the process 800 can be implemented as an optimization algorithm that extends the process of determining a license position and collecting matched subgraphs to calculate an equivalent license unit cost for the enterprise computer system. The standardized graph can be constructed based on the process described with reference to FIG. 4 used to determine a license position and collect matched subgraphs.

In step 802, a licensable product star graph (LPSG) is constructed by evaluating each licensable product to identify any license model that has at least one subgraph associated with the licensable product. All matching subgraphs of a licensable product are used to generate the LPSG.

Figure 9:
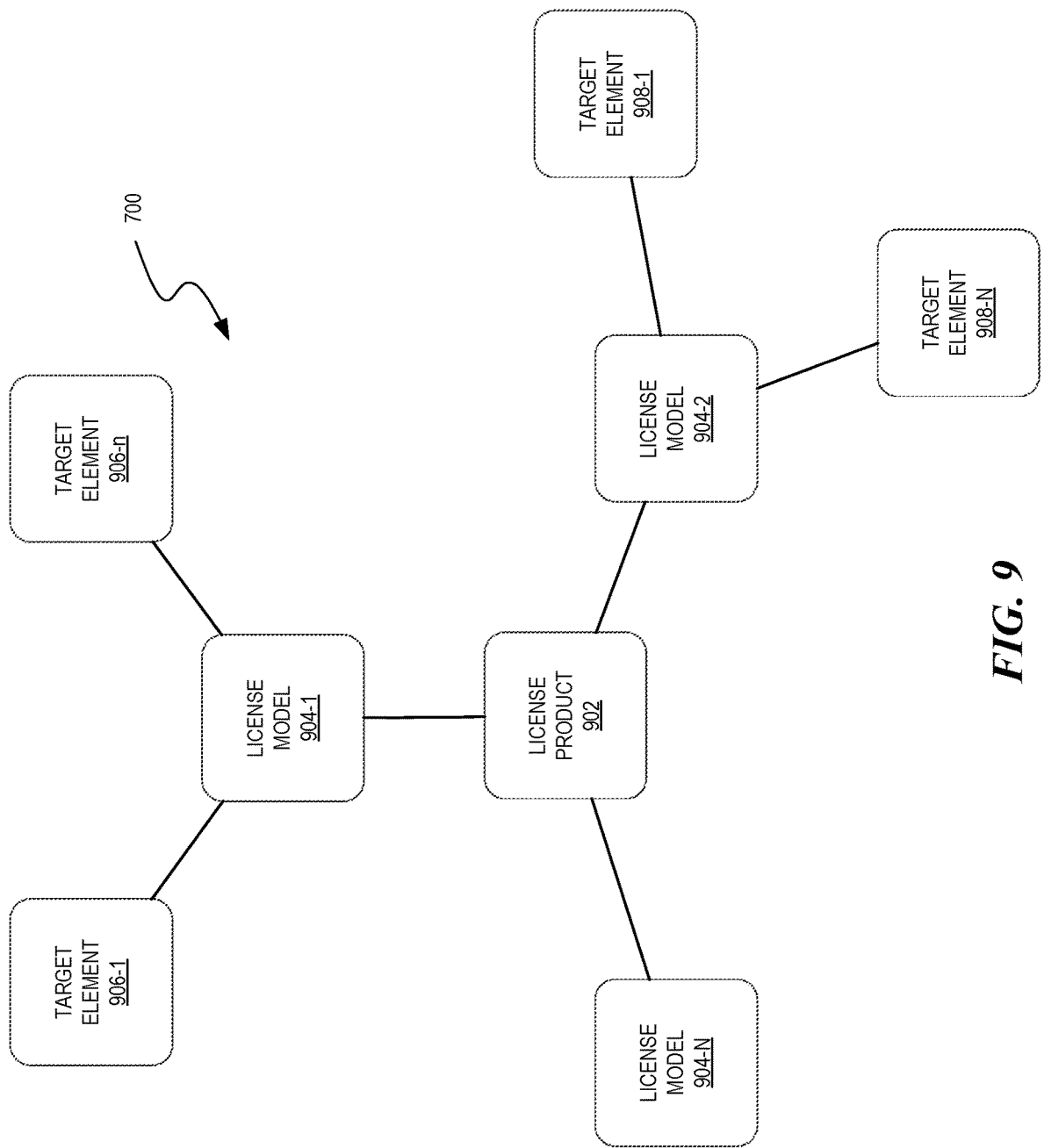
FIG. 9 is a block diagram illustrating an example of a licensable product star graph constructed in accordance with the disclosed standardized graph-based framework.

FIG. 9 is a block diagram that illustrates an example of LPSG 900 constructed in accordance with the standardized graph-based framework. The star graph has a hub node with branches that extend to intermediate nodes, which extend to terminal nodes. The hub node represents a licensable product 902. The intermediate nodes each represent a license model 904 that connects to the licensable product 902. The terminal nodes each represent target element 906 or 908 that connect to the license models 904. Each license model 904 can be associated with any number of target elements. For example, the license model 904-1 is connected to target elements 906-1 through 906-N, and the license model 904-2 is connected to target elements 908-1 through 908-N. A target element that is associated with multiple license models of a licensable product in an LPSG can be represented with different instances of the same target element directly connected to its respective license model. In other words, the same target element could be represented as different instances of the same target element node connected to different license models.

Referring back to FIG. 8, an LPSG is then evaluated to determine licensable coverage. For example, in step 804, the LPSG is evaluated to determine whether it has any terminal target element nodes. If so, in step 806, if the LPSG lacks any terminal target element nodes, then it is determined that the licensable product cannot be licensed properly in the enterprise computer system.

In step 808, each branch of a license model node is evaluated to determine whether it has any target element nodes. Any license model branch that lacks any target element nodes and is not the baseline license model is a failed license model that cannot be equally compared to the baseline license model. If so, in step 806, this failed license model branch may cause the process 800 to abort or the user is given the option to exclude the licensable product or failed license model from the equivalent license unit cost.

In some embodiments, the initial license model under consideration is the baseline license model. In step 810, the LPSG is evaluated to determine whether the licensable product is missing a baseline license model. If so, the coverage of that license model is incomplete for the enterprise and the process fails. If so, in step 806, the failed baseline model may cause the process 800 to abort or the user is given the option to exclude the licensable product or failed license model from the equivalent license unit cost. In some embodiments, the step 806 may automatically exclude the licensable product or failed license model and continue analyzing the LPSG.

In step 812, an LPSG is generated for any remaining licensable products and all license models represented with target elements of the enterprise computer system. Therefore, each LPSG can be evaluated in isolation to reduce the local complexity of the graph being considered. As indicated above, each LPSG must be covered by a licensable product that is covered by a license model, and each license model that is not a baseline license model must be covered by at least one target element.

In step 814, a licensable product constellation graph (LPCG) is constructed by evaluating each LPSG to determine whether they share common target elements for the same license model. In doing so, the target elements can be considered in unison to accurately determine an equivalent license unit cost. Moreover, doing so reduces any redundant nodes in the LPCG. In particular, any target elements of the same license model in different LPSGs are consolidated into a group referred to as a target element set. Accordingly, the LPCG has an array of target element sets formed collectively from each license model of each LPSG.

Figure 10:
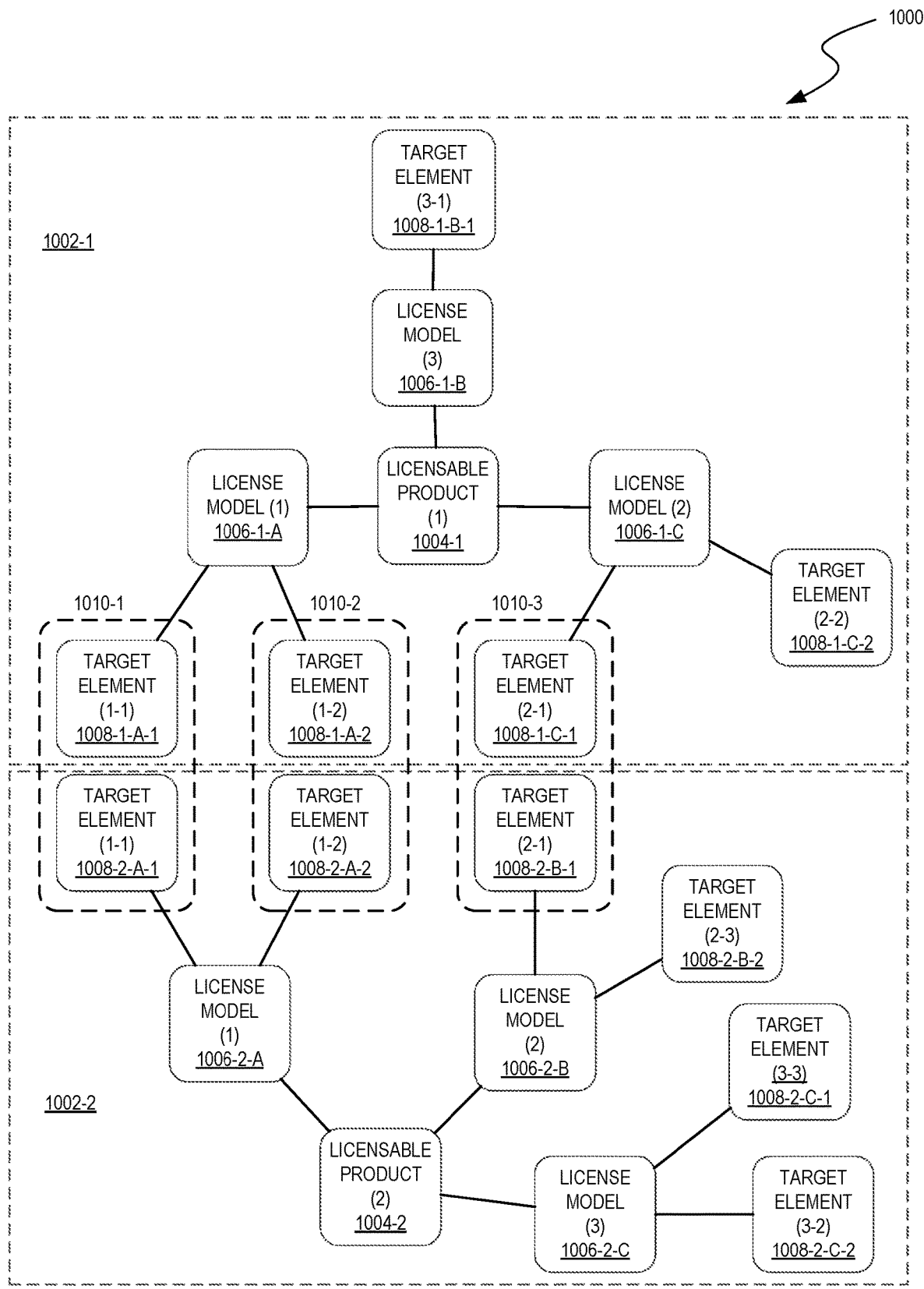
FIG. 10 is a block diagram illustrating an example of a licensable product constellation graph constructed in accordance with the disclosed standardized graph-based framework.

FIG. 10 is a block diagram illustrating an example of an LPCG 1000 constructed of LPSG 1002-1 and LPSG 1002-2. Each LPSG 1002 has a licensable product node 1004 at a respective hub, with branches that extend to license models 1006, which can terminate at target elements 1008. Constructing the LPCG 1000 involves identifying common target elements for the same license model of different LPSGs 1002. The LPSGs 1002 are linked at common target element sets 1010. Linking common target elements into the target element sets 1010 in a graphical form facilitates understanding how the LPCG 1000 is logically composed of LPSGs 1002. The relationship of LPSGs linked by target elements can be readily stored in a graph database to enable an improved analysis as described elsewhere in this disclosure.

For example, given N licensable products of the LPCG 1000, and M licensable product choices, a set of grouped target element arrays can be constructed as follows:

---

Set iterative over M = {
 #1) {LP[1]LMChoice[1]TEs and LP[2] LMChoice[1]TEs ... and LP[N] LMChoice[1]TEs},
 #2) {LP[1] LMChoice[2]TEs and LP[2] LMChoice[2]TEs ... and LP[N] LMChoice[2]TEs},
 ...
 #3) {LP[1] LMChoice[M]TEs and LP[2] LMChoice[M]TEs ... and LP[N] LMChoice[M]TEs}}

---

This combination set (CS) represents all cases under consideration to determine a correct cost for each license model of the LPCG 1000. In the context of FIG. 10, the CS represents the entire diagram of the single LPCG. In lines #1 through #3, the CS is represented as a "multidimensional array," and M iterates over a license model. In this array, a licensable product is a first dimension of the array, indexed by N. A license model LMChoice is indexed by M. The quantity of target elements is unspecified and not explicitly indexed here.

Line #1 {LP[1]LMChoice[1]TEs and LP[2] LMChoice [1]TEs ... and LP[N] LMChoice[1]TEs} specifies all target elements that have an edge to LM[1] but vary over licensable product (by N). In FIG. 10, LP[1]LM[1]TEs=upper row of target elements 1-1's and 1-2's, which pertain to LP[1] and LM[1] in FIG. 10. Further, LP[2]LM[1]TEs=lower row of target elements 1-1's and 1-2's, which pertain to LP[2] and LM[1] of FIG. 10. If there were additional LPSGs or licensable products in FIG. 10, N would be more than these two licensable products. Because this example considers LM[1] for line #1, LM[2] and LM[3] may be ignored as well as all associated target elements.

Therefore, by considering only a single LPCG, other licensable products are ignored because they have no licensing relationship (i.e., the decomplexifying value of identifying the LPCG). This is most applicable in the case of optimization; specifically, to reduce the computational complexity of evaluating combinatorial sets. That is, the disclosed technique seeks a globally optimal solution from a set, which means that all licensable products are considered. However, considering all in unison is costlier then considering each individually.

For example, consider an arrangement with two license models, four LPCGs, and one LPCG. Assigning A/B to license models, a combination can be represented as four-tuple of A/B where the position of the A/B in the tuple represents which a particular LPSG.

Consider 2^4=16 cases (AAAA, AAAB, AABA, AABB, ABAA, ABAB, ABBA, ABBB, BAAA, BAAB, BABA, BABB, BBAA, BBAB, BBBA, BBBB). Next consider two license models, four LPCGs, and two LPCGs. Each LPCG (consisting of two LPCGs) can be considered in isolation. The first LPCG is represented in A/B terms, and the second LPCG's license model choice is represented in C/D terms. Hence, each LPSG may be represented by a 2-tuple and considered in isolation. That is, (AA, Aft BA, BB) is considered separately from (CC, CD, DC, DD). The cost of the two isolated evaluations is summed, 4+4=a cost of 8. As such, decoupling the evaluations reduces the computational cost, and the LPCGs represent the required couplings between licensable products via graphical edges.

In step 816, the number of target elements considered can be further reduced. For example, the target elements of each license model choice group may be filtered so that redundant target elements in a group are removed from consideration. These redundant elements are the same ones identified as redundant when the LPCGs were logically constructed. The removed target elements are also redundant in the original enterprise infrastructure graph. Target elements are usually only counted once under a license model. Because each target element should only be counted once (e.g., each should only incur a licensing cost on the enterprise once), duplicate target elements in a line may be further grouped (e.g., as shown in FIG. 10), and reduced by only keeping one instance for subsequent consideration. In the case of line #1, for FIG. 10, LP[1]LM[1]TEs is equivalent to LP[2]LM[1]TEs and, as such, target element 1-1 and target element 1-2 are each only counted once.

Line #2 in this example represents {LP[1] LMChoice[2]TEs and LP[2] LMChoice[2]TEs ... and LP[N] LMChoice[2]TEs} as follows: (i) LP[1] LMChoice[2]TEs=upper row of target elements 2-1's and 2-2, and (ii) LP[2] LMChoice[2]TEs=lower row of target element 2-1's and 2-3. In a similar way to line #1, target element 2-1 reduces to one counted instance. However, target elements 2-2 and 2-3 must be counted separately to cover all licensable products in the LPCG in the context of license model 2, otherwise the enterprise would be non-compliant because some licensable products would not meet the contractual terms.

In line #3, target elements 3-1 and 3-2 must be counted without reduction to satisfy the contractual requirements of having licensable product 1 and licensable product 2, respectively. In particular, FIG. 10 can be fully enumerated as:

1) {LP[1]LMChoice[1]TEs and LP[2]LMChoice[1]TEs} => TE1-1, TE1-2 and TE1-1, TE1-2 => TE1-1, TE1-2
2) {LP[1]LMChoice[2]TEs and LP[2]LMChoice[2]TEs} => TE2-1, TE2-2 and TE2-1, TE2-3 => TE2-1, TE2-2, TE2-3
3) {LP[1]LMChoice[3]TEs and LP[2]LMChoice[3]TEs} => TE3-1 and TE3-2, TE3-3 => TE3-1, TE3-2, TE3-3

For the license position of LM[m], all the original matched subgraphs are filtered to include only the licensable products considered for the LPCGs, filtered to include only the target elements for LM[m], and further filtered to include only the reduced set of target elements determined to be in the target element array associated with LM[m]. These subgraphs are analyzed as follows:

$$LicensePosition_m = \left( \sum_{i=1}^{SubGraphs_m} TEWeightFunction_m(TargetElement(i), Parameters(i)) \right)$$

and

Total License $Cost_m = LicensePosition_m * CostPerLicenseUnits_m$

In step 818, a cost per license unit is determined for LM[m] to make it equivalent to the baseline license model cost as follows:

$CostPerLicenseUnits_m$=Total License $Cost_{baseline}$/ $LicensePosition_m$

Thus, the process 800 can determine an underlying cost for comparing license models. The resulting cost could be used as a threshold to evaluate alternative license models (i.e., alternative to the baseline LM) that can provide optimal operational efficiency.

Determining Optimal Licensing Mix

The disclosed embodiments include an optimization technique that can determine whether licenses are efficiently consumed in a computer system and/or allow an optimization algorithm to compare licenses with different terms. As such, the disclosed embodiments can calculate an optimal mix of licenses ("licensing mix"). The process for determining an optimal licensing mix may increase the combinations of graphical structures used to identify where a mixed licensing approach would be optimal.

There are numerous ways to license products for use in an enterprise computer system. The selection of a suitable combination of licenses can ensure that an enterprise computer system operates efficiently while avoiding the risk that a licensable product will consume a costly license. The disclosed license optimization technique can typically select from many available license models to formulate a combination of products of an enterprise computer system. Hence, an enterprise would benefit by selecting an optimal combination of license models. The optimal consumption mix of available licenses should minimize the cost necessary to adequately support an enterprise computer system while remaining in compliance with the selected licenses. Based on this optimization, an enterprise can also re-balance how its computer system is covered by the evaluated licenses.

For example, the disclosed embodiments can calculate a licensing mix by recording in memory any relationships of enterprise assets, license type characteristics, and costs of license models. The enterprise asset interrelationships for matching license models, and weights associated with licensing costs and characteristics bring a unique benefit.

Figure 11:
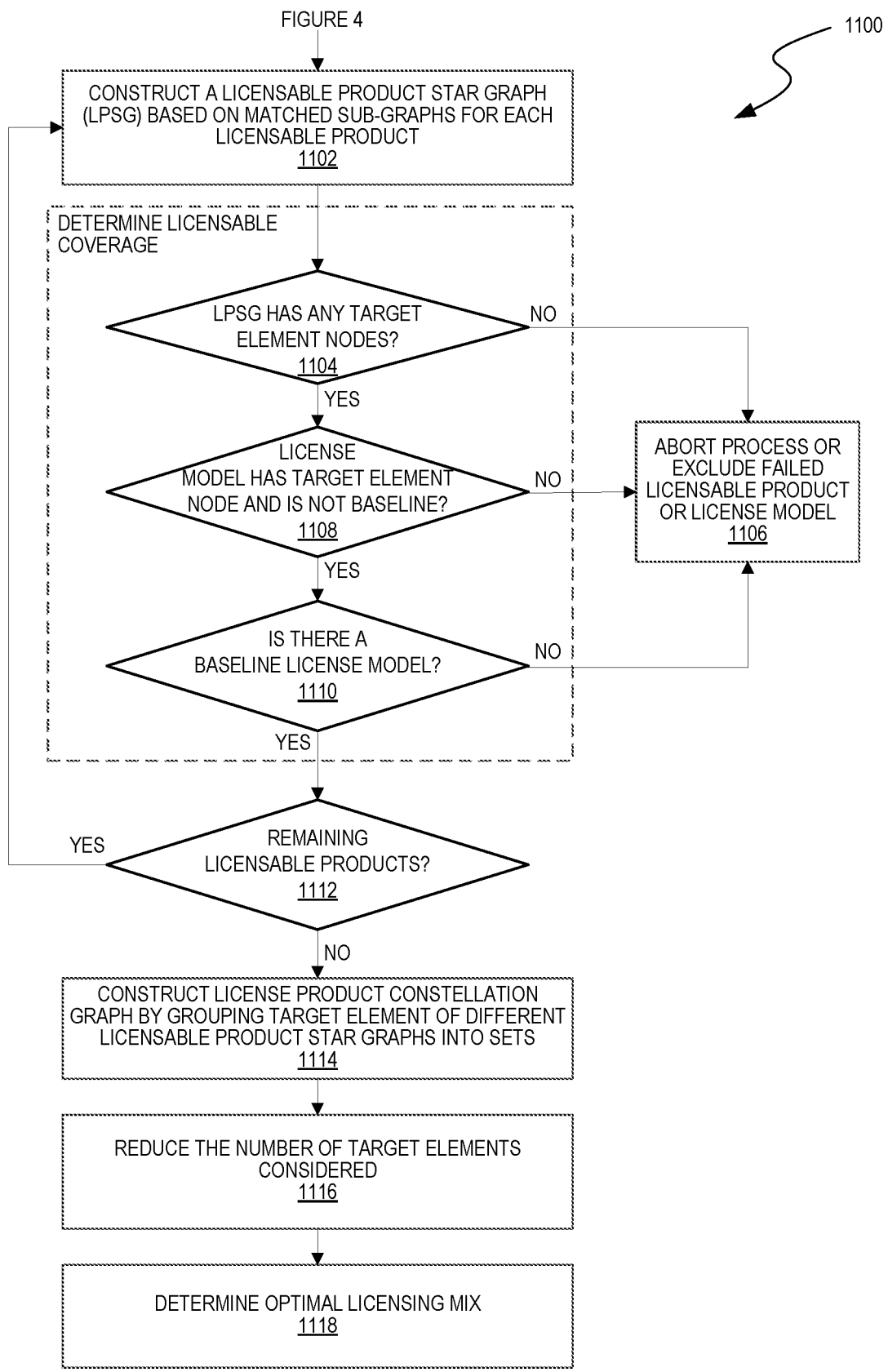
FIG. 11 is a flowchart illustrating a process to determine an optimal licensing mix for an enterprise computer system in accordance with the disclosed standardized graph-based framework.

FIG. 11 is a flowchart that illustrates a process for determining an optimal licensing mix for an enterprise computer system in accordance with the disclosed standardized graph-based framework. In some embodiments, the process 1100 can be implemented as an optimization algorithm operable to diagnose or assess an enterprise computer system.

For example, one or more standardized graphs can be constructed for an enterprise computer system in accordance with the standardized graph-based framework. The standardized graph(s) can be constructed based on the process described with reference to FIG. 4 to determine a license position and collect matched subgraphs.

In step 1102, a licensable product star graph (LPSG) is constructed in accordance with the standardized graph-based framework. The LPSG is determined from the enterprise infrastructure graph such as the example illustrated in FIG. 6. In particular, each licensable product of an enterprise computer system is evaluated to determine any license models that have matched subgraphs. All the matched subgraphs for a given licensable product are used to create a LPSG.

In the LPSG, a licensable product node may be connected to any number of license model nodes, which may be connected to any number of target element nodes. A target element node that is associated with different license model nodes of the same licensable product node can be represented as different instances of the same target element nodes connected to the different license model nodes.

FIG. 9 is a block diagram that illustrates an example of LPSG 900 constructed in accordance with the standardized graph-based framework. The star graph has a hub node with branches that extend to intermediate nodes, which extend to terminal nodes. The hub node represents a licensable product 902. The intermediate nodes each represent a license model 904 that connects to the licensable product 902. The terminal nodes each represent target element 906 or 908 that connect to the license models 904. Each license model 904 can be associated with any number of target elements. For example, the license model 904-1 is connected to target elements 906-1 through 906-N, and the license model 904-2 is connected to target elements 908-1 through 908-N. A target element that is associated with multiple license models of a licensable product in an LPSG can be represented with different instances of the same target element directly connected to its respective license model. In other words, the same target element could be represented as different instances of the same target element node connected to different license models.

Referring back to FIG. 11, an LPSG is then evaluated to determine licensable coverage, which refers to the coverage combination of licensable products in an enterprise computer system. The determination of licensable coverage can encompass a systematic evaluation of different types of nodes in the LPSG.

For example, in step 1104, the LPSG is evaluated to determine licensable whether it has any terminal target element nodes. If the LPSG lacks any terminal target element nodes then, in step 1106, it is determined that the licensable product cannot be licensed properly in the enterprise.

In step 1106, each branch of a license model node is evaluated to determine whether it has any target element node. Any license model branch that lacks any target element node and is not the baseline license model is a failed license model that cannot be equally compared to the baseline license model. If so, in step 1106, this failed license model branch may cause the process 800 to abort or the user is given the option to exclude the licensable product or failed license model from determining an optimal licensing mix.

In step 1108, the LPSG is evaluated to determine whether the licensable product is missing a baseline license model. If so, the coverage of that license model is incomplete for the enterprise and the process fails. If so, in step 1106, the failed baseline model may cause the process 1100 to abort or the user is given the option to exclude the licensable product or failed license model from the determination of the equivalent license unit cost. In some embodiments, the step 1106 may automatically exclude the licensable product or failed license model and continue analyzing the LPSG.

In step 1112, an LPSG is generated for any remaining licensable products and all license models represented with target element of the enterprise computer system. Therefore, each LPSG can be evaluated in isolation to reduce the local complexity of the graph being considered. As indicated above, each LPSG must be covered by a licensable product that is covered by a license model, and each license model that is not a baseline license model may be covered by at least one target element. If the LM has no TEs, the LP is not covered by that LM (and as a degenerate case of non-coverage, would not be optimal coverage) but could be covered by the TE(s) of an alternate LM. This optimization is different from the equivalence case, where we are trying to compare "like-to-like."

In step 1114, a licensable product constellation graph (LPCG) is constructed by evaluating each of LPSG to determine whether they share common target elements for the same licensable model. In doing so, the target elements can be considered in unison to accurately determine an equivalent license unit cost. Moreover, doing so reduces any redundant nodes in the LPCG. In particular, any target elements of the same license model in different LPSGs are consolidated into a group referred to as a target element set. Accordingly, the LPCG has an array of target element sets formed collectively from each license model of each LPSG.

FIG. 10 is a block diagram illustrating an example of an LPCG 1000 constructed of LPSG 1002-1 and LPSG 1002-2. Each LPSG 1002 has a licensable product node 1004 at a respective hub, with branches that extend to license models 1006, which can terminate at target elements 1008. Constructing the LPCG 1000 involves identifying common target elements for the same license model of different LPSGs 1002. The LPSGs 1002 are linked at common target element sets 1010. Linking common target elements into the target element sets 1010 in a graphical form facilitates understanding how the LPCG 1000 is logically composed of LPSGs 1002. The relationship of LPSGs linked by target elements can be readily stored in a graph database to enable an improved analysis as described elsewhere in this disclosure.

For example, given N licensable products of an LPCG, and M licensable models under consideration, a set of target element arrays is arranged into the following combinations as a combinatorial set (CS):

```
Combinatorial Set = {
    #1) {LP[1]LMChoice[1]TEs and LP[2] LMChoice[1]TEs ...
and LP[N] LMChoice[1]TEs},
    #2) {LP[1] LMChoice[2]TEs and LP[2] LMChoice[1]TEs ...
and LP[N] LMChoice[1]TEs},
    ...
    #3) {LP[1] LMChoice[M]TEs and LP[2] LMChoice[M]TEs ...
and LP[N] LMChoice[M]TEs}}
```

The CS for determining an optimal licensing mix is similar to that for determining an equivalent license unit cost; however, there are some differences under each CS. When determining an equivalent license unit cost, each license model is considered in isolation such that the same license model is fixed for a line over iterating licensable products in N. In contrast, when determining an optimal licensing mix, there could be a combination of different license models that achieves an optimal cost for the LPCG rather than only using a single license model (over another license model).

Each line of the CS groups target element sets pertaining to a single license model indexed by M. When comparing license models (e.g., equivalent license unit cost), the lines are decoupled and compared (e.g., license models are compared). When considering optimal combinations, trade-offs must be considered between license models thereby coupling the evaluation of license models. Further, when determining an equivalent license unit cost, in line #2 every element has a license model choice of 2, implying that all license model indices increment with the line index. In contrast, when determining an optimal licensing mix, line #2 only increments the first element's license model choice index implying that all possible combinations of license model indices must be considered across elements of a line.

Each individual licensable product must iterate over each license model choice individually. As an example, the CS for the LPCG of FIG. 10 can be fully enumerated as:

1) {LP[1]LMChoice[1]TEs and LP[2]LMChoice[1]TEs} => TE1-1, TE1-2 and TE1-1, TE1-2 => TE1-1, TE1-2
2) {LP[1]LMChoice[2]TEs and LP[2]LMChoice[1]TEs} => TE2-1, TE2-2 and TE1-1, TE1-2 => TE1-1, TE1-2, TE2-1, TE2-2
3) {LP[1]LMChoice[3]TEs and LP[2]LMChoice[1]TEs} => TE3-1 and TE1-1, TE1-2 => TE1-1, TE1-2, TE3-1
4) {LP[1]LMChoice[1]TEs and LP[2]LMChoice[2]TEs} => TE1-1, TE1-2 and TE2-1, TE2-3 => TE1-1, TE1-2, TE2-1, TE2-3
5) {LP[1]LMChoice[2]TEs and LP[2]LMChoice[2]TEs} => TE2-1, TE2-2 and TE2-1, TE2-3 => TE2-1, TE2-2, TE2-3
6) {LP[1]LMChoice[3]TEs and LP[2]LMChoice[2]TEs} => TE3-1 and TE2-1, TE2-2 => TE3-1, TE2-1, TE2-2
7) {LP[1]LMChoice[1]TEs and LP[2]LMChoice[3]TEs} => TE1-1, TE1-2 and TE3-2, TE3-3 => TE1-1, TE1-2, TE3-2, TE3-3
8) {LP[1]LMChoice[2]TEs and LP[2]LMChoice[3]TEs} => TE2-1, TE2-2 and TE3-2, TE3-3 => TE2-1, TE2-2, TE3-2, TE3-3
9) {LP[1]LMChoice[3]TEs and LP[2]LMChoice[3]TEs} => TE3-1 and TE3-2, TE3-3 => TE3-1, TE3-2, TE3-3

Again, each LPCG can be analyzed in isolation to reduce the local complexity of the considered graph. For each LPCG, each licensable product must be covered by a license model. For each license model coverage considered, the target elements associated with the license model must be considered.

In step 1116, the number of considered target elements can be further reduced. For example, the target elements of each license model choice group may be filtered so that redundant target elements in a group are removed from consideration. These redundant elements are the same ones identified as redundant when the LPCGs were logically constructed. The removed target elements are also redundant of the original enterprise infrastructure graph. Target elements are usually only counted once under a license model. To reduce the number of target elements considered further, the CS elements may be compared to one another. Upon comparing elements, if an element is determined to be a superset of another (e.g., have the same target elements), then the superset may be removed from consideration because the superset will incur the additional cost of including the additional target elements.

For example, as shown above, the license models of lines #1 through #3 are iterated over LP1 for each license model #1, #2, and #3, resulting in 3×3=9 possibilities. Further, line #1 can be reduced to target elements 1-1 and 1-2 because both entries are listed twice. Moreover, line #1 is superior to lines #2, #3, #4, and #7 because they are super sets of the target elements contained in line 1. That is, it only takes TE1-1 and TE-2 to attain complete licensing coverage for option 1. Therefore, those lines do not need to be considered over line #1.

A rational enterprise would choose optimal licensing because it incurs minimal cost (i.e., fewest weighted license units). For example, consider a simplifying assumption that each target element is worth the same amount of licensing units. Given that, two target elements would be worth two licensing units, which is the minimal number over possible combinations. A rational enterprise would choose this optimal minimal amount.

In step 1118, each remaining CS elements are considered a target element set. For each target element in a set, the matched subgraphs that contain that target element and were matched as part of the license model associated with the target element are considered. These subgraphs are grouped by license so that for LMs[m]:

$$LicensePosition_m = \left( \sum_{i=1}^{SubGraphs_m} TEWeightFunction_m(TargetElement(i), Parameters(i)) \right)$$

And

Total License
$Cost_m = LicensePosition_m * CostPerLicenseUnits_m$

For each LMs[m] in each element CS[e], this cost is found and summed for the element. For the LPCG under consideration, these sums are tabulated:

$$\text{Total License Costs}[e]_{LPCG} = \left( \sum_{m=1}^{LMs_e} \text{Total License } Cost_m \right)$$

The lowest cost is then chosen for the LPCG and represented as:

Minimal License $Cost_{LPCG}$=Min(Total License Cost-$s_{LPCG}$)

Finally:

$$\text{Optimal License Cost} = \left( \sum_{c=1}^{LPCGs} \text{Minimal License } Cost_{LPCG} \right)$$

Computer Implementation

Figure 12:
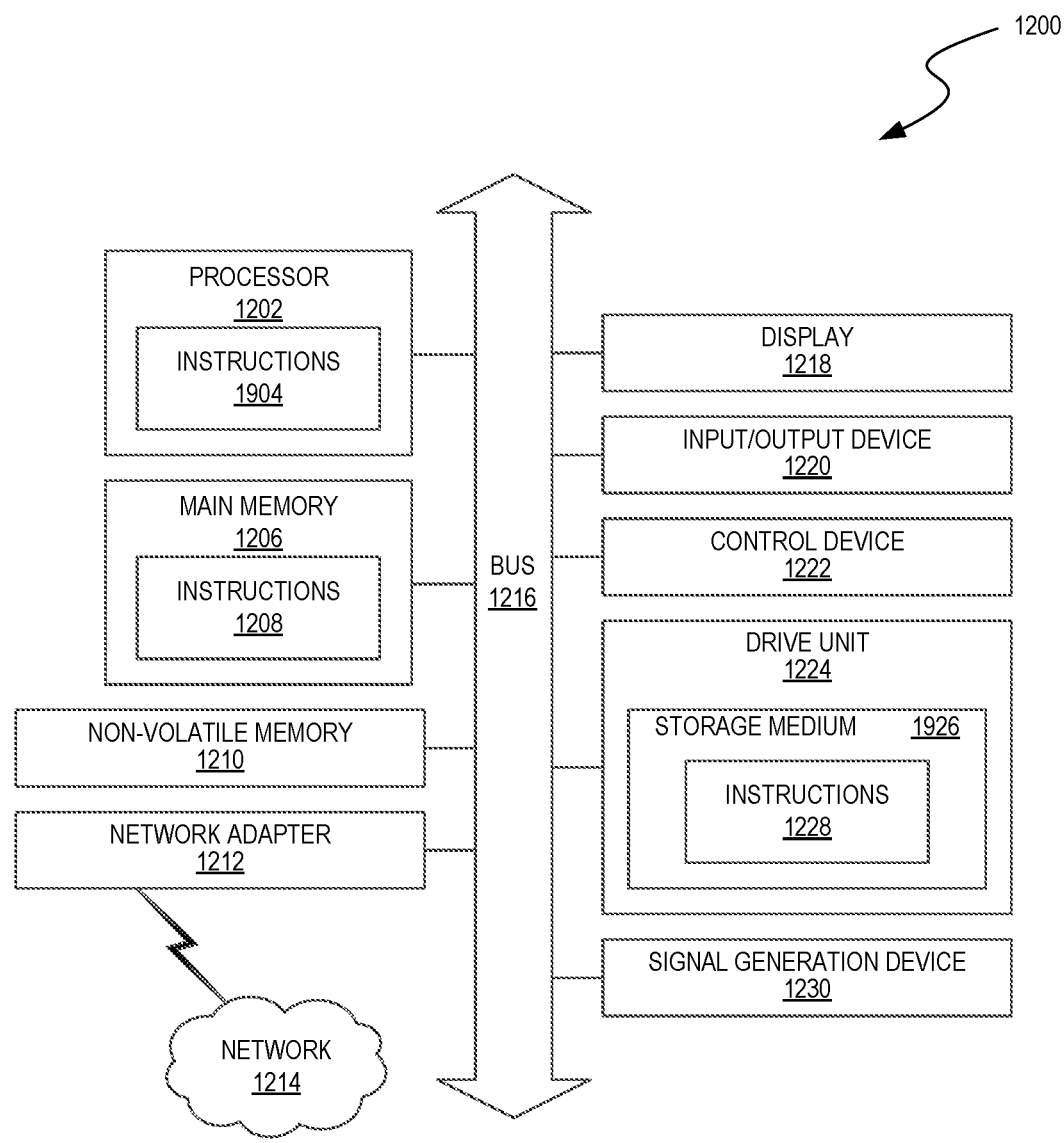
FIG. 12 is a block diagram of a computer system that can implement features of at least some of the disclosed technology.

FIG. 12 is a block diagram that illustrates a computing system in which at least some features of the disclosed technology can be implemented. The computing system 1200 may include one or more central processing units ("processors") 1202, main memory 1206, non-volatile memory 1210, network adapter 1212 (e.g., network interfaces), display 1218, input/output devices 1220, control device 1222 (e.g., keyboard, pointing device), drive unit 1224 including a storage medium 1226, and signal generation device 1230 that are communicatively connected to a bus 1216. The bus 1216 is illustrated as an abstraction that represents any one or more separate physical buses, point-to-point connections, or both connected by appropriate bridges, adapters, or controllers. Therefore, the bus 1216 can include, for example, a system bus, a peripheral component interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In some embodiments, the computing system 1200 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a gaming device, a music player, any portable, mobile, handheld device, or any machine capable of executing a set of instructions (sequential or otherwise) that specify actions to be taken by the computing system.

While the main memory 1206, non-volatile memory 1210, and storage medium 1226 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 1228. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 1204, 1208, 1228) set at various times in various memory and storage devices in a computer, and that, when read and executed by one or more processing units or processors 1202, cause the computing system 1200 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 1210, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 1212 enables the computing system 1200 to mediate data in a network 1214 with an entity that is external to the computing system 1200, such as a network appliance, through any known and/or convenient communications protocol supported by the computing system 1200 and the external entity. The network adapter 1212 can include one or more of a network adaptor card, a wireless network interface card, a router, an AP device, a wireless router, a switch, a multilayer switch, a protocol converter, a gateway, a bridge, bridge router, a hub, a digital media receiver, and/or a repeater.

The network adapter 1212 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

From the foregoing, it will be appreciated that specific embodiments of the invention have been described herein for purposes of illustration, but that various modifications may be made without deviating from the scope of the invention. Accordingly, the invention is not limited except as by the appended claims.

The invention claimed is:

1. A computer-implemented method for determining an equivalent license unit of an enterprise computer system in accordance with a standardized graph-based framework, the method comprising:
   identifying licensable products associated with an enterprise computer system;
   generating a graph-based representation of the enterprise computer system in accordance with a standardized graph-based framework, wherein the graph-based representation comprises nodes and edges stored in a graph database, the nodes including nodes that represent respective elements of the licensable products, the edges representing relationships between the nodes, wherein nodes and edges of the graph-based representation comprise properties, wherein the graph database is configured to be queried using a graph query language to retrieve information regarding the graph-based representation;
   constructing a licensable product star graph (LPSG) for each licensable product in accordance with the standardized graph-based framework, wherein constructing the LPSG comprises querying the graph-based representation using the graph query language to identify any license models that have at least one subgraph associated with at least one of the licensable products;

constructing a licensable product constellation graph (LPCG) in accordance with the standardized graph-based framework based on each LPSG to determine any common target elements of any license model to link the LPSGs, wherein the LPCG includes an array of target elements formed collectively from license models of each LPSG, wherein the array of target elements form a combinatorial set, wherein the target elements included in the combinatorial set are compared with each other and based on an individual target element being a superset of another individual target element the individual target element is removed, and wherein the target elements are linked in a graphical form; and determining an equivalent license unit metric for the license models based on the LPCG, wherein for each remaining target element in the combinatorial set, the matched subgraphs which include the remaining target element are considered in the determination.

2. The computer-implemented method of claim 1, wherein the equivalent license unit metric is a cost per license unit relative to a baseline license model.

3. The computer-implemented method of claim 1, wherein determining the equivalent license unit metric comprises:
for a license position of a license model:
filtering to include only any licensable products of the LPCG;
filtering to include only any target elements of the license model; and
filtering to include a reduced set of target elements.

4. The computer-implemented method of claim 1, wherein each LPSG comprises:
a hub node that represents a licensable product;
a plurality of intermediate nodes connected to the hub node, wherein each intermediate node represents a license model; and
a plurality of terminal nodes connected to the plurality of intermediate nodes, wherein each terminal node represents a target element, and any target element that is associated with a plurality of license models is represented with different instances of the target element that are each directly connected to a respective one of the plurality of license models.

5. The computer-implemented method of claim 1, wherein constructing the LPCG comprises:
identifying common target elements of any license model in each LPSG; and
consolidating any common target elements into one or more target element sets.

6. The computer-implemented method of claim 1 further comprising:
responsive to determining that an LPSG lacks any terminal target element nodes, determining that its licensable product cannot be licensed properly for the enterprise computer system.

7. The computer-implemented method of claim 1 further comprising:
determining that any license model lacks any target element and is not a baseline license model such that the license model cannot be compared to a baseline license model.

8. The computer-implemented method of claim 1 further comprising:
excluding any failed licensable product or license model from determining the equivalent license unit metric.

9. The computer-implemented method of claim 1 further comprising:
giving a user an option to exclude any failed licensable product or failed license model from determining the equivalent license unit metric.

10. The computer-implemented method of claim 1 further comprising:
determining a licensable coverage of the enterprise computer system by:
determining that a license model is a baseline license model.

11. The computer-implemented method of claim 1 further comprising:
determining a licensable coverage of the enterprise computer system by:
determining that a license product lacks any a baseline license model and is thereby a failed licensable product; and
automatically excluding the failed licensable product from determining the equivalent license unit metric.

12. The computer-implemented method of claim 1 further comprising:
determining a licensable coverage of the enterprise computer system by:
evaluating each license model to determine whether it has any target element nodes.

13. The computer-implemented method of claim 1 further comprising:
determining a licensable coverage of the enterprise computer system by:
evaluating an LPSG to determine whether it has any target elements.

14. The computer-implemented method of claim 1, wherein an LPSG is generated for each identified licensable product.

15. The computer-implemented method of claim 14, wherein each LPSG is evaluated in isolation to reduce complexity of the standardized graph-based framework.

16. The computer-implemented method of claim 14, wherein each LPSG has a licensable product that is connected to a license model, and each license model that is not a baseline license model is connected to at least one target element.

17. The computer-implemented method of claim 1 further comprising:
evaluating any target elements in unison to determine the equivalent license unit metric.

18. The computer-implemented method of claim 1, wherein the equivalent license unit metric is a license unit cost determined as a baseline total license cost divided by a license position of the enterprise computer system.

19. A computer system comprising:
a processor; and
a memory storing instructions that, when executed by the processor, cause the computer system to:
identify licensable products associated with an enterprise computer system;
generate a graph-based representation of the enterprise computer system in accordance with a standardized graph-based framework, wherein the graph-based representation comprises nodes and edges stored in a graph database, the nodes including nodes that represent respective elements of the licensable products, the edges representing relationships between the nodes, wherein nodes and edges of the graph-based representation comprise properties, wherein the graph database is configured to be queried using a graph query language to retrieve information regarding the graph-based representation;

construct a licensable product star graph (LPSG) for each licensable product in accordance with the standardized graph-based framework, wherein constructing the LPSG comprises querying the graph-based representation using the graph query language to identify any license models that have at least one subgraph associated with at least one of the the licensable products;

construct a licensable product constellation graph (LPCG) in accordance with the standardized graph-based framework based on each LPSG to determine any common target elements of any license model to link the LPSGs, wherein the LPCG includes an array of target elements formed collectively from license models of each LPSG, wherein the array of target elements form a combinatorial set, wherein the target elements included in the combinatorial set are compared with each other and based on an individual target element being a superset of another individual target element the individual target element is removed, and wherein the target elements are linked in a graphical form; and determine an equivalent license unit metric for the license models based on the LPCG, wherein for each remaining target element in the combinatorial set, the matched subgraphs which include the remaining target element are considered in the determination.

20. Non-transitory computer storage media storing instructions that when executed by a system of one or more processors, cause the system to:

identify licensable products associated with an enterprise computer system;

generate a graph-based representation of the enterprise computer system in accordance with a standardized graph-based framework, wherein the graph-based representation comprises nodes and edges stored in a graph database, the nodes including nodes that represent respective elements of the licensable products, the edges representing relationships between the nodes, wherein nodes and edges of the graph-based representation comprise properties, wherein the graph database is configured to be queried using a graph query language to retrieve information regarding the graph-based representation;

construct a licensable product star graph (LPSG) for each licensable product in accordance with the standardized graph-based framework, wherein constructing the LPSG comprises querying the graph-based representation using the graph query language to identify any license models that have at least one subgraph associated with at least one of the licensable products;

construct a licensable product constellation graph (LPCG) in accordance with the standardized graph-based framework based on each LPSG to determine any common target elements of any license model to link the LPSGs, wherein the LPCG includes an array of target elements formed collectively from license models of each LPSG, wherein the array of target elements form a combinatorial set, wherein the target elements included in the combinatorial set are compared with each other and based on an individual target element being a superset of another individual target element the individual target element is removed, and wherein the target elements are linked in a graphical form; and determine an equivalent license unit metric for the license models based on the LPCG, wherein for each remaining target element in the combinatorial set, the matched subgraphs which include the remaining target element are considered in the determination.

* * * * *

UNITED STATES PATENT AND TRADEMARK OFFICE
CERTIFICATE OF CORRECTION

PATENT NO. : 11,531,731 B2
APPLICATION NO. : 15/969685
DATED : December 20, 2022
INVENTOR(S) : Michael J. Faulhaber et al.

It is certified that error appears in the above-identified patent and that said Letters Patent is hereby corrected as shown below:

In the Claims

Column 29, Line 7, in Claim 19, after "the" delete "the".

Signed and Sealed this
Twenty-first Day of May, 2024

Katherine Kelly Vidal
*Director of the United States Patent and Trademark Office*